US012533521B2

(12) United States Patent
Kotchevar et al.

(10) Patent No.: US 12,533,521 B2
(45) Date of Patent: Jan. 27, 2026

(54) SYSTEMS AND METHODS FOR PROGRAMMING NEUROMODULATION SEQUENCES

(71) Applicant: Boston Scientific Neuromodulation Corporation, Valencia, CA (US)

(72) Inventors: Mary Kotchevar, Minneapolis, MN (US); Hemant Bokil, Cambridge, MA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 587 days.

(21) Appl. No.: 17/671,267

(22) Filed: Feb. 14, 2022

(65) Prior Publication Data

US 2022/0257957 A1  Aug. 18, 2022

Related U.S. Application Data

(60) Provisional application No. 63/149,570, filed on Feb. 15, 2021.

(51) Int. Cl.
*A61N 1/372* (2006.01)
*A61N 1/36* (2006.01)
(Continued)

(52) U.S. Cl.
CPC ..... *A61N 1/37247* (2013.01); *A61N 1/36132* (2013.01); *A61N 1/36185* (2013.01);
(Continued)

(58) Field of Classification Search
CPC ............ A61N 1/36132; A61N 1/36185; A61N 1/37217; A61N 1/37252; G16H 40/63
See application file for complete search history.

(56) References Cited

U.S. PATENT DOCUMENTS 8,620,436 B2  12/2013 Parramon et al.
9,446,231 B2   9/2016 Carbunaru et al.
(Continued)

FOREIGN PATENT DOCUMENTS

EP  4291293 A1  12/2023
EP  4291293 B1  12/2024
(Continued)

OTHER PUBLICATIONS

"Australian Application Serial No. 2022220342, First Examination Report mailed Aug. 5, 2024", 3 pgs.
(Continued)

*Primary Examiner* — James M Kish
*Assistant Examiner* — Laura Hodge
(74) *Attorney, Agent, or Firm* — Schwegman Lundberg & Woessner. P.A.

(57) ABSTRACT

A neuromodulator may include a neuromodulation generator and a plurality of electrodes. A programming system may be configured to wirelessly communicate with the neuromodulator. The programming system may be configured to receive user input for use in creating at least two block sequence descriptions for at least two neuromodulation sites, respectively. Each of the at least two block sequence descriptions may define both a sequence of blocks for each of the at least two neuromodulation sites and timing relationships between the blocks in the sequences. Each of the blocks may correspond to a neuromodulation field generated using a corresponding neuromodulation parameter set. The programming system may be configured to translate the block sequence descriptions into neuromodulator instructions and wirelessly communicate the neuromodulator instructions to the neuromodulator for use by the neuromodulator to deliver the neuromodulation to each of the at least two neuromodulation sites.

19 Claims, 16 Drawing Sheets

(51) Int. Cl.
*G16H 40/63* (2018.01)
*H04W 4/20* (2018.01)

(52) U.S. Cl.
CPC ..... *A61N 1/37217* (2013.01); *A61N 1/37252* (2013.01); *G16H 40/63* (2018.01); *H04W 4/20* (2013.01)

(56) References Cited

U.S. PATENT DOCUMENTS

| | | | |
|---|---|---|---|
| 9,974,958 | B2 | 5/2018 | Griffith |
| 10,456,583 | B2 * | 10/2019 | Doan ................. A61N 1/37241 |
| 10,617,872 | B2 | 4/2020 | Marnfeldt |
| 2009/0326608 | A1 | 12/2009 | Huynh et al. |
| 2014/0130026 | A1 * | 5/2014 | Yohn ..................... G06F 9/4552 717/151 |
| 2015/0328467 | A1 * | 11/2015 | Demers .............. A61N 1/37217 607/45 |
| 2018/0071514 | A1 * | 3/2018 | Wagenbach ........... A61N 1/025 |
| 2018/0214699 | A1 * | 8/2018 | Kothandaraman ......................... A61N 1/36053 |
| 2021/0023372 | A1 * | 1/2021 | Musallam ............ A61K 31/045 |
| 2021/0154481 | A1 * | 5/2021 | Scheltienne ....... A61N 1/36192 |

FOREIGN PATENT DOCUMENTS

| | | | |
|---|---|---|---|
| WO | WO-2018129280 A1 * | 7/2018 | ............... A61B 5/24 |
| WO | WO-2022174149 A1 | 8/2022 | |

OTHER PUBLICATIONS

"European Application Serial No. 22707567.8, Response to Communication Pursuant to Rules 161(1) and 162 filed Apr. 2, 2024", 11 pgs.

"International Application Serial No. PCT/US2022/016325, International Preliminary Report on Patentability mailed Aug. 24, 2023", 8 pgs.

"International Application Serial No. PCT/US2022/016325, International Search Report mailed May 19, 2022", 4 pgs.

"International Application Serial No. PCT/US2022/016325, Written Opinion mailed May 19, 2022", 6 pgs.

"Australian Application Serial No. 2022220342, Response filed Mar. 18, 2025 to First Examination Report mailed Aug. 5, 2024", 14 pgs.

* cited by examiner

SYSTEMS AND METHODS FOR PROGRAMMING NEUROMODULATION SEQUENCES

CLAIM OF PRIORITY

This application claims the benefit of priority of U.S. Provisional Patent Application Ser. No. 63/149,570, filed on Feb. 15, 2021, which is herein incorporated by reference in its entirety.

TECHNICAL FIELD

This document relates generally to medical systems, and more particularly, but not by way of limitation, to systems, devices, and methods for programming neuromodulation therapy.

BACKGROUND

Neuromodulation, also referred to as neurostimulation, has been proposed as a therapy for a number of conditions. Examples of neuromodulation include Spinal Cord Stimulation (SCS), Deep Brain Stimulation (DBS), Peripheral Nerve Stimulation (PNS), and Functional Electrical Stimulation (FES). Implantable neuromodulation systems have been applied to deliver a neuromodulation therapy. An implantable neuromodulation system may include an implantable neuromodulator, also referred to as an implantable wave generator or an implantable pulse generator (IPG), and one or more implantable leads each including one or more electrodes. The implantable neuromodulator delivers neuromodulation energy through one or more electrodes placed on or near a target site in the nervous system. An external programming device may be used to program the implantable neuromodulator with modulation parameters controlling the delivery of the neuromodulation energy. The neuromodulation energy may be delivered using an electrical modulation waveform, which may be defined by a plurality of modulation parameters. For example, electrical modulation waveform may be an electrical pulsed waveform. Other parameters that may be controlled or varied include the electrodes within the electrode array that are activated, the amplitude, pulse width, and rate (or frequency) of the electrical pulses provided to individual ones of the activated electrodes.

SUMMARY

An example (e.g. "Example 1") of a system may include a neuromodulator and a programming system. The neuromodulator may include a neuromodulation generator and a plurality of electrodes for use to deliver neuromodulation to at least two neuromodulation sites. The programming system may be configured to wirelessly communicate with the neuromodulator, and may include a user interface. The programming system may be configured to receive user input, via the user interface, for use in creating at least two block sequence descriptions for the at least two neuromodulation sites, respectively. Each of the at least two block sequence descriptions may define both a sequence of blocks for each of the at least two neuromodulation sites and timing relationships between the blocks in the sequences. Each of the blocks may correspond to a neuromodulation field generated using a corresponding neuromodulation parameter set. The programming system may be configured to translate the block sequence descriptions into neuromodulator instructions and wireless communicate the neuromodulator instructions to the neuromodulator for use by the neuromodulator to deliver the neuromodulation to each of the at least two neuromodulation sites according to the corresponding block sequence description.

In Example 2, the subject matter of Example 1 may optionally be configured such that the programming system further includes a translator and an assembler. The translator may be configured to translate the block sequence description into assembly language, and the assembler may be configured to translate the assembly language into neuromodulator instructions.

In Example 3, the subject matter of Example 2 may optionally be configured such that the translator is configured to optimize the blocks for updating register settings at the same time and minimize memory usage, and then determine at least one of whether there are consecutive no action blocks that can be combined into a single block or whether blocks can be optimized to a function.

In Example 4, the subject matter of any one or more of Examples 1-3 may optionally be configured such that the wirelessly-communicated neuromodulator instructions may include bytes corresponding to fractionalized energy allocated to individual ones of the plurality of electrodes, and the bytes may be stored in registers of the neuromodulator for use by the neuromodulator to allocate energy to the individual ones of the plurality of electrodes.

In Example 5, the subject matter of Example 4 may optionally be configured such that the neuromodulation generator may include a plurality of independent current sources for the plurality of electrodes, respectively, and the bytes corresponding to fractionalized energy allocated to individual ones of the plurality of electrodes may be used by the independent current sources to generate current amplitudes for the individual ones of the plurality of electrodes.

In Example 6, the subject matter of any one or more of Examples 1-5 may optionally be configured such that the blocks in the sequence of blocks may correspond to different electrode configurations to create a sequence of spatially different modulation fields.

In Example 7, the subject matter of any one or more of Examples 1-6 may optionally be configured such that the user input defining the sequence of blocks may include user input to select and order blocks for the sequence of blocks.

In Example 8, the subject matter of any one or more of Examples 1-7 may optionally be configured such that the sequence of blocks may include Off blocks for which no neuromodulation is provided.

In Example 9, the subject matter of any one or more of Examples 1-8 may optionally be configured such that an amplitude, pulse width and rate are associated with each of the blocks.

In Example 10, the subject matter of any one or more of Examples 1-9 may optionally be configured such that user inputs defining the timing relationships may include at least one of: inter-block timing between blocks in the sequence of blocks; or a duration, a start time or a stop time for blocks in the sequence blocks.

In Example 11, the subject matter of any one or more of Examples 1-10 may optionally be configured such that the sequence of blocks may be repeated and associated with an ON-OFF duty cycle representing an ON time for repeating the sequence of blocks and an OFF time.

In Example 12, the subject matter of any one or more of Examples 1-11 may optionally be configured such that the neuromodulator may include a plurality of registers for storing neuromodulation parameter data, wherein an individual one of the plurality of registers are configured to store neuromodulation parameter data for at least one of the plurality of electrodes. The programming system may include a plurality of field order tables corresponding to the plurality of registers, and each of the plurality of tables contains settings for a respective one of the plurality of registers.

In Example 13, the subject matter of Example 12 may optionally be configured such that each of the plurality of field order tables may include a plurality of rows and a plurality of columns, and the plurality of rows may correspond to a plurality of block sequences, respectively, to define field order settings.

In Example 14, the subject matter of Example 13 may optionally be configured such that each of the plurality of rows may correspond to the register data for two of the plurality of electrodes.

In Example 15, the subject matter of any one or more of Examples 12-14 may optionally be configured to further include a translator configured to translate the block sequence description into assembly language, and an index table containing pointers to the plurality of rows in the field order tables. The translator may be configured to use the block sequence descriptions to determine one of the pointers for use to determine the settings for the respective one of the plurality of registers.

Example 16 includes subject matter (such as a method, means for performing acts, machine readable medium including instructions that when performed by a machine cause the machine to performs acts, or an apparatus to perform) for programming a neuromodulator to deliver neuromodulation to at least two neuromodulation sites. The subject matter may include creating, based on user input, at least two block sequence descriptions for the at least two neuromodulation sites. Each of the at least two block sequence descriptions may define both a sequence of blocks for each of the at least two neuromodulation sites and timing relationships between the blocks in the sequences. Each of the blocks may correspond to a neuromodulation field generated using a corresponding neuromodulation parameter set. The subject matter may include translating the block sequence descriptions into neuromodulator instructions, and wirelessly communicating the neuromodulator instructions to the neuromodulator for use by the neuromodulator to deliver the neuromodulation to each of the at least two neuromodulation sites according to the corresponding block sequence description.

In Example 17, the subject matter of Example 16 may optionally be configured such that the translating the block sequence descriptions into neuromodulator instructions may include using a translator to translate the block sequence description into assembly language, and using an assembler to translate the assembly language into the neuromodulation instructions.

In Example 18, the subject matter of Example 17 may optionally be configured to further include using the translator to optimize the blocks for updating register settings at the same time and minimize memory usage, and determine at least one of whether there are consecutive no action blocks that can be combined into a single block or whether blocks can be optimized to a function.

In Example 19, the subject matter of any one or more of Examples 16-18 may optionally be configured such that the neuromodulator instructions wirelessly communicated to the neuromodulator may include bytes corresponding to fractionalized energy allocated to individual ones of the plurality of electrodes. The subject matter may further include storing the bytes in registers of the neuromodulator for use by the neuromodulator to allocate energy to the individual ones of the plurality of electrodes.

In Example 20, the subject matter of Example 19 may optionally be configured such that the neuromodulator may further include a plurality of independent current sources for the plurality of electrodes, respectively, and the bytes in the registers of the neuromodulator may be used by the independent current sources to generate current amplitudes for the individual ones of the plurality of electrodes.

In Example 21, the subject matter of any one or more of Examples 16-20 may optionally be configured such that the blocks in the sequence of blocks may correspond to different electrode configurations to create a sequence of spatially different modulation fields.

In Example 22, the subject matter of any one or more of Examples 16-21 may optionally be configured such that the user input may include user input to select and order blocks for the sequence of blocks.

In Example 23, the subject matter of any one or more of Examples 16-22 may optionally be configured such that the sequence of blocks may include Off blocks for which no neuromodulation is provided.

In Example 24, the subject matter of any one or more of Examples 16-23 may optionally be configured such that an amplitude, pulse width and rate are associated with each of the blocks.

In Example 25, the subject matter of any one or more of Examples 16-24 may optionally be configured such that the timing relationships may include at least one of: inter-block timing between blocks in the sequence of blocks; or a duration, a start time or a stop time for blocks in the sequence blocks.

In Example 26, the subject matter of any one or more of Examples 16-25 may optionally be configured such that the sequence of blocks may be repeated and associated with an ON-OFF duty cycle representing an ON time for repeating the sequence of blocks and an OFF time.

In Example 27, the subject matter of any one or more of Examples 16-26 may optionally be configured such that the neuromodulator may include a plurality of registers for storing neuromodulation parameter data for at least one of the plurality of electrodes, and the translating the block sequence descriptions into neuromodulator instructions may include using a plurality of field order tables corresponding to the plurality of registers to provide the neuromodulation parameter data.

In Example 28, the subject matter of Example 27 may optionally be configured such that each of the plurality of field order tables may include a plurality of rows and a plurality of columns, and the plurality of rows may correspond to a plurality of block sequences, respectively, to define field order settings.

In Example 29, the subject matter of Example 27 may optionally be configured to further include translating the block sequence description into assembly language, and using both an index table containing pointers to the plurality of rows in the field order tables and the block sequence descriptions to determine one of the pointers for use to determine the settings for the respective one of the plurality of registers.

Example 30 includes subject matter (such as a device, apparatus, or machine) that may include non-transitory machine-readable medium including instructions, which when executed by a machine, cause the machine to perform a method for programming a neuromodulator to deliver neuromodulation to at least two neuromodulation sites. The method may include creating, based on user input, at least two block sequence descriptions for the at least two neuromodulation sites. Each of the at least two block sequence descriptions may define both a sequence of blocks for each of the at least two neuromodulation sites and timing relationships between the blocks in the sequences. Each of the blocks may correspond to a neuromodulation field generated using a corresponding neuromodulation parameter set. The method may include translating the block sequence descriptions into neuromodulator instructions, and wirelessly communicating the neuromodulator instructions to the neuromodulator for use by the neuromodulator to deliver the neuromodulation to each of the at least two neuromodulation sites according to the corresponding block sequence description.

In Example 31, the subject matter of Example 30 may optionally be configured such that the translating the block sequence descriptions into neuromodulator instructions may include translating the block sequence description into assembly language, and translating the assembly language into the neuromodulation instructions.

In Example 32, the subject matter of any one or more of Examples 30-31 may optionally be configured such that the neuromodulator instructions wirelessly communicated to the neuromodulator may include bytes corresponding to fractionalized energy allocated to individual ones of the plurality of electrodes. The method may further include storing the bytes in registers of the neuromodulator for use by the neuromodulator to allocate energy to the individual ones of the plurality of electrodes.

In Example 33, the subject matter of any one or more of Examples 30-32 may optionally be configured such that the blocks in the sequence of blocks may correspond to different electrode configurations to create a sequence of spatially different modulation fields.

In Example 34, the subject matter of any one or more of Examples 30-33 may optionally be configured such that the timing relationships may include at least one of: inter-block timing between blocks in the sequence of blocks; or a duration, a start time or a stop time for blocks in the sequence blocks.

In Example 35, the subject matter of any one or more of Examples 30-34 may optionally be configured such that the neuromodulator instructions wirelessly communicated to the neuromodulator may include bytes corresponding to fractionalized energy allocated to individual ones of the plurality of electrodes. The method may further include storing the bytes in registers of the neuromodulator for use by the neuromodulator to allocate energy to the individual ones of the plurality of electrodes.

This Summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
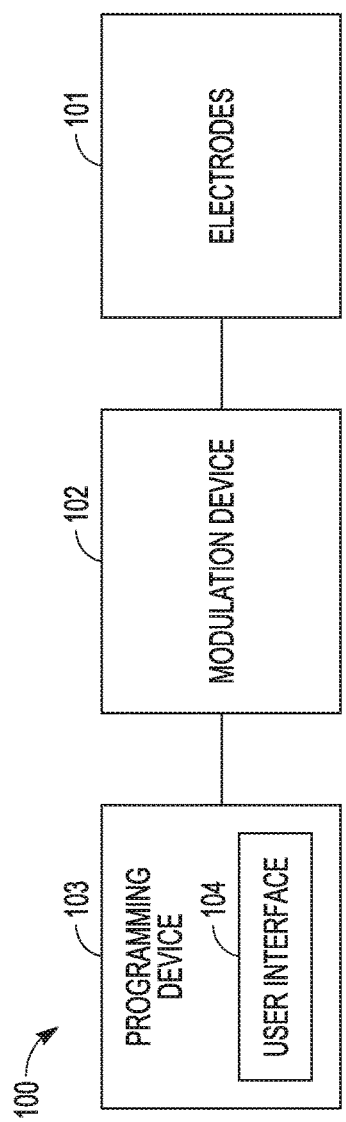
FIG. 1 illustrates, by way of example, an embodiment of a neuromodulation system.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter.

Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Advancements in neuroscience and neurostimulation research have led to a demand for using complex and/or individually optimized patterns of neurostimulation pulses for various types of therapies. Programming of neuromodulation therapy conventionally involves separate and independent programming of each of a multitude of modulation parameters. The modulation waveform may comprise multiple pulses with distinct shapes or morphology, as characterized by distinct pulse amplitudes, pulse widths, pulse rates, or other pulse morphological parameters. The multitude of modulation parameters may also include an electrode configuration used to deliver electrical pulses to the targeted tissue. The electrodes may be capable of being selectively programmed to act as anodes (positive), cathodes (negative), or left off (zero). Other parameters that may be controlled or varied include the amplitude, pulse width, and rate (or frequency) of the electrical pulses provided to individual electrodes or groups of two or more electrodes within the electrode array. Each electrode configuration, along with the electrical pulse parameters, constitutes a modulation parameter set for use in an electrostimulation therapy.

The present subject matter relates to constructs and optimizations that enable efficient storage and delivery of neuromodulation patterns within the neuromodulator hardware. These patterns may include a sequence of spatially-different neuromodulation fields. That is, one neuromodulation field and a subsequent neuromodulation field in the sequence may cover different tissue volumes using different neuromodulation field shapes and/or locations of the neuromodulation fields. By way of example and not limitation, these patterns may include two or more sequences of spatially-different neuromodulation fields, where the two or more sequences are generated using two or more neuromodulation channels and are delivered to two or more neural targets, respectively. By way of example, such neuromodulation patterns may include but are not limited to patterns such as may be used in a coordinated reset (CR) therapy. CR therapy refers to a therapy that attempts to disrupt abnormal neuronal synchronization using patterns that include both spatial and temporal patterns to desynchronize the abnormal synchronous neuronal activity by delivering phase resetting stimuli at different times to different sub-populations involved with the abnormal neuronal synchronization.

The user input that defines the sequences of spatially-different neuromodulation fields and the timing relationship(s) are transformed into instructions that the neuromodulator can understand in order to implement such sequences of neuromodulation patterns. These steps are efficiently performed for these complex patterns. Sequences are built of blocks with each block associated with a fixed field. Furthermore, the blocks have timing relationships with other block(s). When the sequences include CR sequences, by way of example, each CR sequence may be associated with a list of fields; each CR sequence may be associated with a specified number of On and Off blocks; each CR sequence may be associated with a Duty Cycle; each CR field may be associated with a unique amplitude, pulse width and rate; and each block may be associated with a field order. Unique features, such as the identified features for CR sequences, may be used to construct the neuromodulator instructions. A programmer system may take the sequence definition information as input and translate it to a series of neuromodulator instructions. The programmer system may optimize the instructions to update multiple Application Specific Integrated Circuit (ASIC) register settings at the same time and to minimize memory usage.

FIG. 1 illustrates, by way of example, an embodiment of a neuromodulation system. The illustrated neuromodulation system 100 includes electrodes 101, a modulation device 102, and a programming system such as a programming device 103. The programming system may include multiple devices. The electrodes 101 are configured to be placed on or near one or more neural targets in a patient. The modulation device 102 is configured to be electrically connected to electrodes 101 and deliver neuromodulation energy, such as in the form of electrical pulses, to the one or more neural targets though electrodes 101. The delivery of the neuromodulation is controlled using a plurality of modulation parameters that may specify the electrical waveform (e.g. pulses or pulse patterns or other waveform shapes) and a selection of electrodes through which the electrical waveform is delivered. In various embodiments, at least sonic parameters of the plurality of modulation parameters are programmable by a user, such as a physician or other caregiver. The programming device 103 provides the user with accessibility to the user-programmable parameters. In various embodiments, the programming device 103 is configured to be communicatively coupled to modulation device via a wired or wireless link. In various embodiments, the programming device 103 includes a user interface 104 such as a graphical user interface (GUI) that allows the user to set and/or adjust values of the user-programmable modulation parameters.

Figure 2:
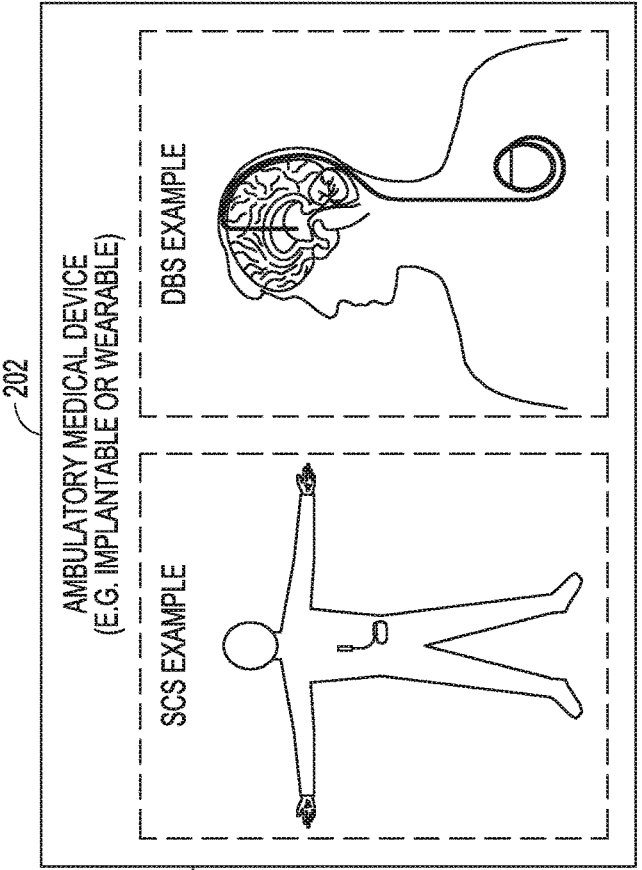
FIG. 2 illustrates, by way of examples and not limitation, the neuromodulation system of FIG. 1 implemented in a spinal cord stimulation (SCS) system or a deep brain stimulation (DBS) system.
Figure 2:
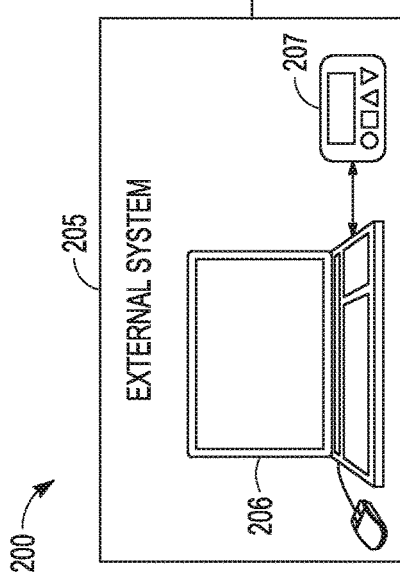

FIG. 2 illustrates, by way of examples and not limitation, the neuromodulation system of FIG. 1 implemented in a spinal cord stimulation (SCS) system or a deep brain stimulation (DBS) system. The illustrated neuromodulation system 200 includes an external system 205 that may include at least one programming device, which is illustrated as an external time 205. The illustrated external system 205 may include a clinician programmer 206 configured for use by a clinician to communicate with and program the neuromodulator, and a remote control 207 configured for use by the patient to communicate with and program the neuromodulator. For example, the remote control device may allow the patient to turn a therapy on and off and/or adjust certain patient-programmable parameters of the plurality of modulation parameters. FIG. 2 illustrates a modulation device as an ambulatory medical device 202. Examples of ambulatory devices include wearable or implantable neuromodulators.

Figure 3:
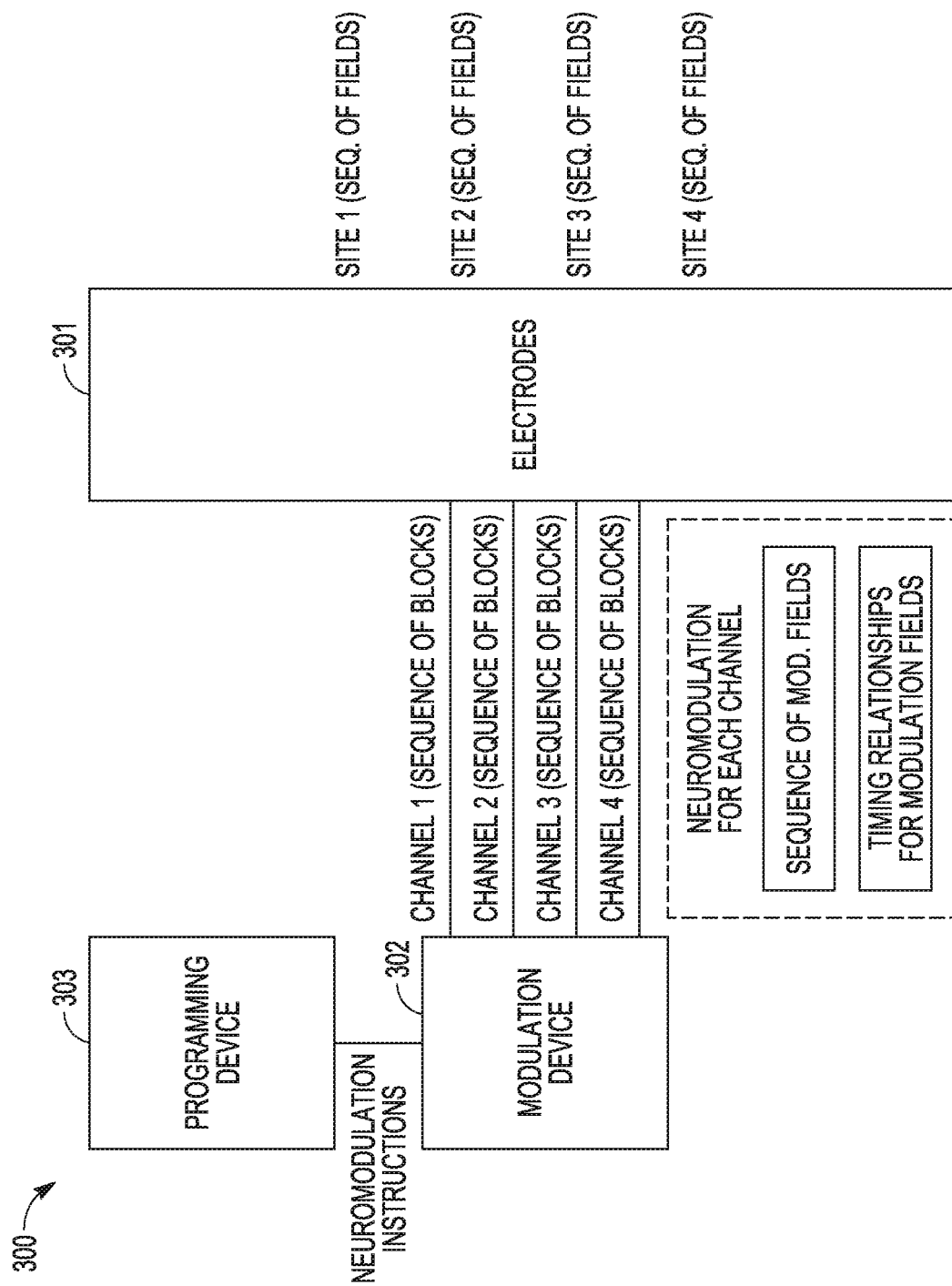
FIG. 3 illustrates, by way of example and not limitation, an embodiment of the neuromodulation system of FIGS. 1-2 configured to program channel(s) of neuromodulation with block sequences to generate sequence(s) of spatially-different neuromodulation fields at neuromodulation site(s).

FIG. 3 illustrates, by way of example and not limitation, an embodiment of the neuromodulation system of FIGS. 1-2 configured to program more than one channel of neuromodulation with block sequences for generating a sequence of spatially-different neuromodulation fields at more than one neuromodulation site. Similar to FIG. 1, the illustrated system 300 includes electrodes 301, a modulation device 302, and a programming system such as a programming device 303. The illustrated modulation device 302 is configured to generate neuromodulation over more than one timing channel. By way of example and not limitation, the modulation device 302 may be configured with a capability to use four timing channels to generate the neuromodulation. A timing channel identifies which electrodes are selected to synchronously source or sink current to create an electric field in the tissue to be stimulated. Amplitudes and polarities of electrodes on a channel may vary. In particular, the electrodes can be selected to be positive (anode, sourcing current), negative (cathode, sinking current), or off (no current) polarity in any of the k timing channels. Thus, for a given period of time (e.g, block of time), each timing channel may be assigned a modulation parameter set, which may include both an electrode configuration (e.g. electrodes selectively programmed to act as anodes (positive), cathodes (negative), or left off (zero)) and waveform parameters (e.g. pulse parameters such as pulse amplitude, pulse width, pulse frequency or variable pulse-to-pulse timing), Since they can have different electrode configurations, each channel may correspond to its own neurostimulation site (e.g. a volume of tissue in which one or more neuromodulation fields are delivered). Subsequent blocks of time on the timing channel may have different parameter sets. A single timing channel may use a sequence of these parameter sets, also referred to herein as a sequence of blocks, to generate a sequence of modulation fields. As such, each timing channel may be used to generate its own sequence of modulation fields as well as to control timing relationships between the fields. One or more of these channels may be used to deliver CR therapy to deliver spatial and temporal patterns to different neuronal sub-populations for desynchronizing abnormal synchronous neuronal activity. The programming device 303 is configured to receive user input related to the sequence of modulation fields and/or the timing relationship for the modulation field, and translate the user input into neuromodulation instructions to be communicated to the modulation device 302. The communicated neuromodulation instructions may be firmware instructions used by firmware within the modulation device to generate the programmed sequences and timing in each of the channels.

Figure 4:
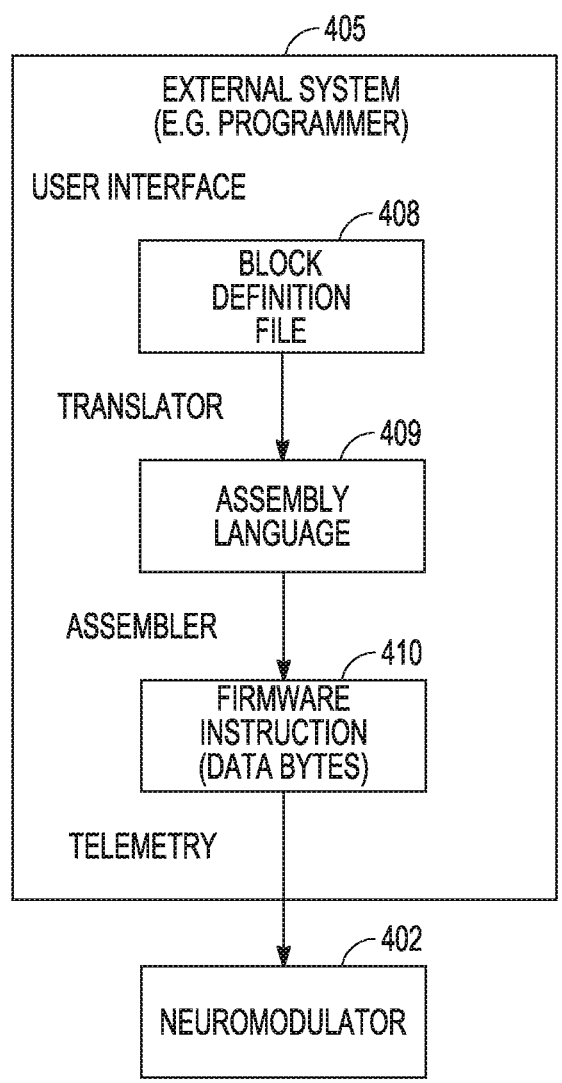
FIG. 4 illustrates, by way of example and not limitation, a process for translating user-inputted block definition files into firmware instructions for wireless communication (e.g. telemetry) to program a modulation device.

FIG. 4 illustrates, by way of example and not limitation, a process for translating user-inputted block definition files into firmware instructions for wireless communication (e.g. telemetry) to program a modulation device. An external system (e.g. programmer) 405 may include a user interface configured for use to input sequence definition information and form a block definition file 408. The programmer may include a translator that is configured to translate the block definition file 408 into assembly language 409. The programmer may further include an assembler configured to assemble the assembly language 409 into firmware instructions (e.g. a series of neuromodulator instructions in data bytes for storage into registers of the neuromodulator) 410. The external system 405 may include telemetry to communicate the firmware instructions to the neuromodulator 402. Thus, the user input that defines the sequences of spatially-different neuromodulation fields and the timing relationship(s) are transformed into instructions that the neuromodulator can understand in order to implement such sequences of neuromodulation patterns. These steps are efficiently performed for these complex patterns. Sequences are built of blocks with each block associated with a fixed field. Furthermore, the blocks have timing relationships with other block(s).

The sequences may include CR sequences. Each CR sequence may be associated with a list of fields. Each CR sequence may be associated with a specified number of On and Off blocks. Each CR sequence may be associated with a Duty Cycle. Each CR field may be associated with a unique amplitude, pulse width and rate. Each block is associated with a field order. Unique features, such as these identified features for CR sequences, may be used to construct the neuromodulator instructions.

Figure 5:
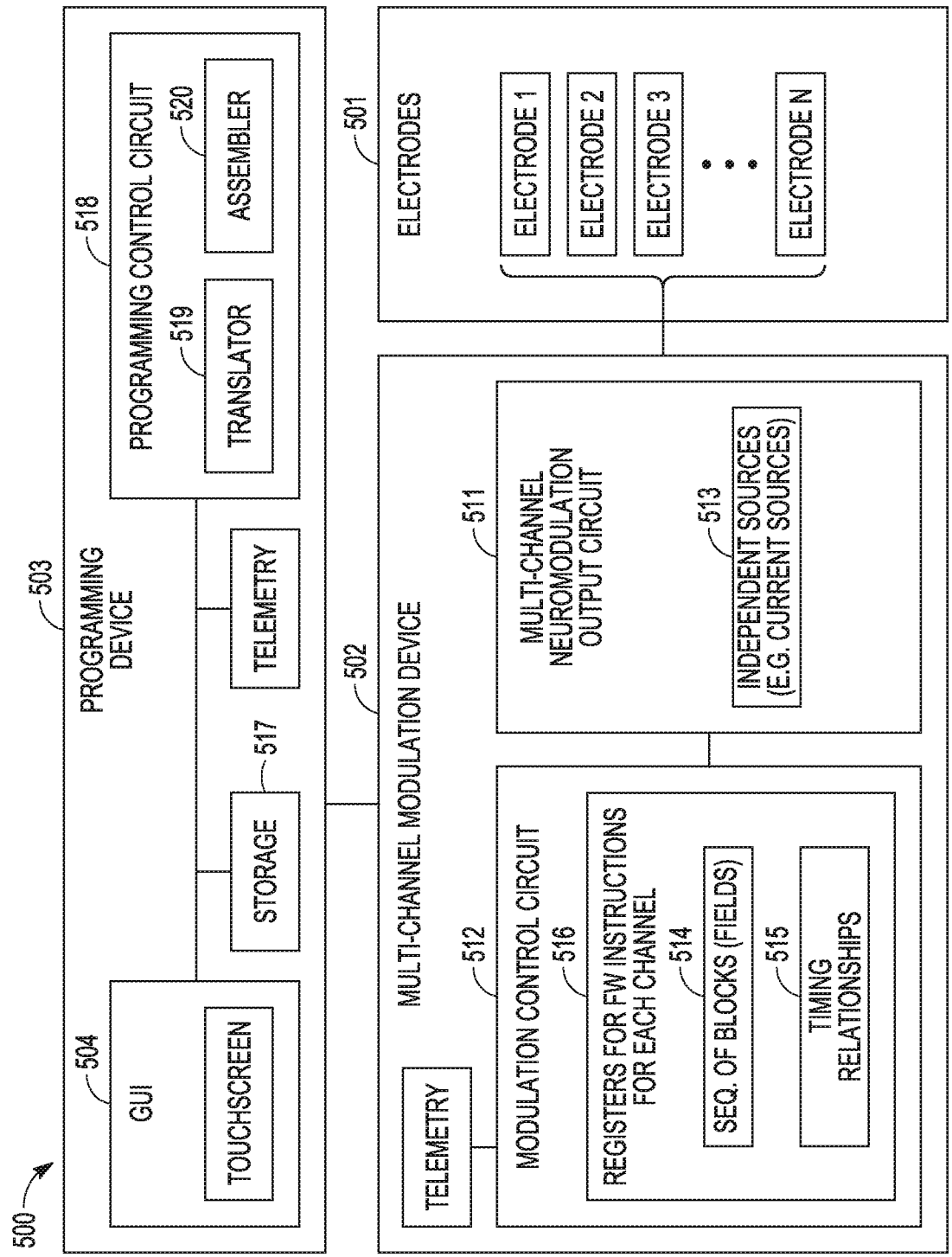
FIG. 5 illustrates a more detailed embodiment of the system illustrated in FIG. 1.

FIG. 5 illustrates a more detailed embodiment of the system illustrated in FIG. 1. Similar to FIG. 1, the illustrated system 500 includes electrodes 501, a modulation device 502, and a programming system such as a programming device 503. The illustrated embodiment of the modulation device 502 is a multi-channel modulation device that include a multi-channel neuromodulation output circuit 511 and a modulation control circuit 512. Those of ordinary skill in the art will understand that the neuromodulation system may include additional components such as sensing circuitry for patient monitoring and/or feedback control of the therapy, telemetry circuitry and power. The modulation output circuit 511 produces and delivers the neuromodulation. Neuromodulation pulses are provided herein as an example. However, the present subject matter is not limited to pulses, but may include other electrical waveforms (e.g. waveforms with different waveform shapes, and waveforms with various pulse patterns). The multi-channel neuromodulation output circuit 511 may include a plurality of independent sources 513 (e.g. independent voltage sources or independent current sources). The modulation control circuit 512 controls the delivery of the neuromodulation pulses using the plurality of modulation parameters. The modulation parameters include parameters for defining the sequence of blocks (e.g. modulation fields) 514 and parameters defining timing relationship(s) 515 for the blocks. These parameters provide firmware instructions for each timing channel of the neuromodulator, and may be stored in registers within the neuromodulator. Examples of circuitry that may be used to generate and deliver neuromodulation pulses are found in the following references, which are herein incorporated by reference in their entirety: U.S. Pat. No. 9,974,958, entitled System and Method for Independently Operating Multiple Neurostimulation Channels; U.S. Pat. No. 9,446,231, entitled Neurostimulation System and Method for Compounding Current to Minimize Current Sources; and U.S. Pat. No. 8,620,436, entitled Current Generation Architecture for an Implantable Stimulator Device Having Course and Fine Current Control.

The electrodes 501 may be on one or more leads that are configured to be electrically connected to modulation device 502. The electrodes 501 may include a plurality of electrodes 501-1 to 501-N distributed in an electrode arrangement. The neuromodulation pulses are each delivered from the modulation output circuit 502 through a set of electrodes selected from the N electrodes that are available for selection. The number of leads and the number of electrodes on each lead may depend on, for example, the distribution of target(s) of the neuromodulation and the need for controlling the distribution of electric field at each target. In one embodiment, by way of example and not limitation, the lead system includes two leads where each lead has eight electrodes. Some embodiments may use a lead system that includes a paddle lead. Some embodiments may include a directional lead that includes at least some segmented electrodes circumferentially disposed about the directional lead. Two or more segmented electrodes may be distributed along a circumference of the lead. The type, number and shape of leads and electrodes may vary according to the intended application.

The neuromodulation system may be configured to modulate brain tissue, configured to modulate spinal target tissue or configured to modulate other neural tissue. The configuration of electrodes used to deliver electrical pulses to the targeted tissue constitutes an electrode configuration, with the electrodes capable of being selectively programmed to act as anodes (positive), cathodes (negative), or left off (zero). In other words, an electrode configuration represents the polarity being positive, negative, or zero. An electrical waveform may be controlled or varied for delivery using electrode configuration(s). The electrical waveforms may be analog or digital signals. In some embodiments, the electrical waveform includes pulses. The pulses may be delivered in a regular, repeating pattern, or may be delivered using complex patterns of pulses that appear to be irregular. Other parameters that may be controlled or varied include the amplitude, pulse width, and rate (or frequency) of the electrical pulses. Each electrode configuration, along with the electrical pulse parameters, can be referred to as a "modulation parameter set." Each set of modulation parameters, including fractionalized current distribution to the electrodes (as percentage cathodic current, percentage anodic current, or off), may be stored and combined into a modulation program that can then be used to modulate multiple regions within the patient.

The number of electrodes available, combined with the ability to generate a variety of complex electrical waveforms (e.g. pulses), presents a huge selection of modulation parameter sets to the clinician or patient. For example, if the neuromodulation system to be programmed has sixteen electrodes, millions of modulation parameter sets may be available for programming into the neuromodulation system. Furthermore, for example some neuromodulation systems may have thirty-two electrodes which exponentially increases the number of modulation parameters sets available for programming.

The programming device 503 in the illustrated system 500 may include a storage device 517, a programming control circuit 518, and a graphical user interface (GUI) 504. The programming control circuit 518 generates the plurality of modulation parameters that controls neuromodulation energy generated by the modulation device. In various embodiments, the GUI 504 may include any type of presentation device, such as interactive or non-interactive screens, and any type of user input devices that allow the user to program the modulation parameters, such as touchscreen, keyboard, keypad, touchpad, trackball, joystick, and mouse. The storage device 517 may store, among other things, modulation parameters to be programmed into the modulation device. Telemetry may be used to communicate between the programming device 503 and the modulation device 502. The programming device 503 may transmit the plurality of modulation parameters to the modulation device 502. In some embodiments, the programming device 503 may transmit power to the modulation device 502. The programming control circuit 518 may generate the plurality of modulation parameters. With reference to FIG. 4, a translator 519 may be used to translate the block definition file into assembly language, and an assembler 520 configured to assemble the assembly language into firmware instructions for transmission to the modulation device and storage in the registers 516. In various embodiments, the programming control circuit 518 may check values of the plurality of modulation parameters against safety rules to limit these values within constraints of the safety rules.

In various embodiments, circuits of neuromodulation, including its various embodiments discussed in this document, may be implemented using a combination of hardware, software and firmware. For example, the circuit of GUI, modulation control circuit, and programming control circuit, including their various embodiments discussed in this document, may be implemented using an application-specific circuit constructed to perform one or more particular functions or a general-purpose circuit programmed to perform such function(s). Such a general-purpose circuit includes, but is not limited to, a microprocessor or a portion thereof, a microcontroller or portions thereof, and a programmable logic circuit or a portion thereof.

Figures 6, 7A, 7B, 7C:
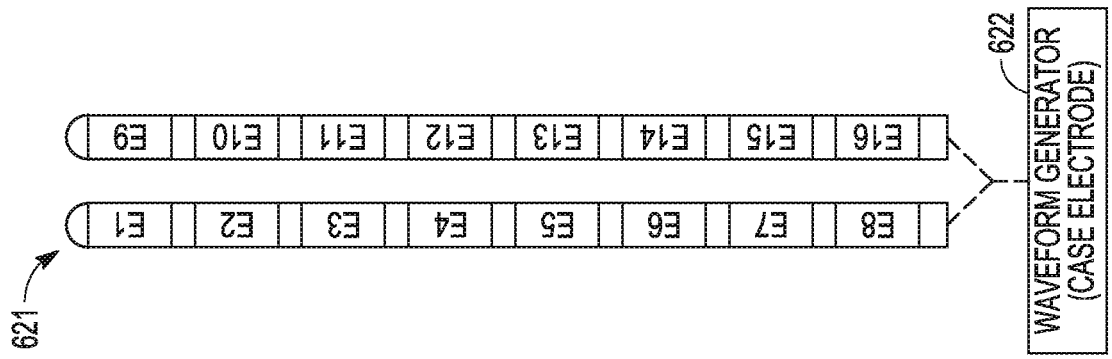
FIG. 6 illustrates, by way of example, some features of the neuromodulation leads and a waveform generator.
FIG. 7A-7C illustrate, by way of a few examples and not limitation, fractionalized energy allocations

FIG. 6 illustrates, by way of example, some features of the neuromodulation leads 621 and a waveform generator 622. The waveform generator 622 may be an implantable device or may be an external device such as may be used to test the electrodes during an implantation procedure. In the illustrated example, one of the neuromodulation leads has eight electrodes (labeled E1-E8), and the other neuromodulation lead has eight electrodes (labeled E9-E16). The actual number and shape of leads and electrodes may vary for the intended application. An implantable waveform generator 622 may include an outer case for housing the electronic and other components. The outer case may be composed of an electrically conductive, biocompatible material, such as titanium, that forms a hermetically-sealed compartment wherein the internal electronics are protected from the body tissue and fluids. In some cases, the outer case may serve as an electrode (e.g. case electrode). The waveform generator 622 may include electronic components, such as a controller/processor (e.g., a microcontroller), memory, a battery, telemetry circuitry, monitoring circuitry, modulation output circuitry, and other suitable components known to those skilled in the art. The microcontroller executes a suitable program stored in memory, for directing and controlling the neuromodulation performed by the waveform generator. Electrical modulation energy is provided to the electrodes in accordance with a set of modulation parameters programmed into the pulse generator. By way of example but not limitation, the electrical modulation energy may be in the form of a pulsed electrical waveform. Such modulation parameters may comprise electrode combinations, which define the electrodes that are activated as anodes (positive), cathodes (negative), and turned off (zero), percentage of modulation energy assigned to each electrode (which may also be referred to as allocated energy or fractionalized electrode configurations), and electrical pulse parameters, which define the pulse amplitude (measured in milliamps or volts depending on whether the pulse generator supplies constant current or constant voltage to the electrode array), pulse width (measured in microseconds), pulse rate (measured in pulses per second), and burst rate (measured as the modulation on duration X and modulation off duration Y). Electrodes that are selected to transmit or receive electrical energy are referred to herein as "activated," while electrodes that are not selected to transmit or receive electrical energy are referred to herein as "non-activated."

Electrical modulation occurs between or among a plurality of activated electrodes, one of which may be the case of the waveform generator. The system may be capable of transmitting modulation energy to the tissue in a monopolar or multipolar (e.g., bipolar, tripolar, or more than three poles) fashion. Monopolar modulation occurs when a selected one of the lead electrodes is activated along with the case of the waveform generator, so that modulation energy is transmitted between the selected electrode and case. Any of the electrodes E1-E16 and the case electrode may be assigned to up to k possible groups or timing "channels." In one embodiment, k may equal four. The timing channel identifies which electrodes are selected to synchronously source or sink current to create an electric field in the tissue to be stimulated. Amplitudes and polarities of electrodes on a channel may vary. In particular, the electrodes can be selected to be positive (anode, sourcing current), negative (cathode, sinking current), or off (no current) polarity in any of the k timing channels.

The waveform generator 622 may be configured to individually control the magnitude of electrical current flowing through each of the electrodes. For example, a current generator may be configured to selectively generate individual current-regulated amplitudes from independent current sources for each electrode. In some embodiments, the pulse generator may have voltage regulated outputs. While individually programmable electrode amplitudes are desirable to achieve fine control, a single output source switched across electrodes may also be used, although with less fine control in programming. Neuromodulators may be designed with mixed current and voltage regulated devices. The energy may be allocated to electrodes to provide a desired modulation field.

FIGS. 7A-7C illustrate, by way of a few examples and not limitation, fractionalized energy allocations. For a given channel, the total anodic current is 100% and the total cathodic current is 100%. FIG. 7A illustrates an example of a fractionalization for one channel where the anodic current is evenly split among electrodes E2 (25%), E10 (25%), E4 (25%) and E12 (25%), and the cathodic current is evenly split among electrodes E3 (−50%) and E11 (−50%). FIG. 7B illustrates an example of a fractionalization for one channel where the anodic current is split among electrodes E1 (40%) and E9 (60%), and the cathodic current is split among electrodes E3 (−20%), E11 (−40%), E4 (−10%) and E12 (−30%). FIG. 7C illustrates an example of fractionalization for two channels similar to the fractionalization of the channels in FIGS. 7A and 7B, respectively. The active electrodes for channel 1 are E1, E2, E3, E9, E10, and E11. The active electrodes for channel 2 are E5, E7, E8, E13, E15 and E16. The anodic current for the first channel is evenly split among electrodes E1 (25%), E9 (25%), E3 (25%) and E11 (25%), and the cathodic current for the first channel is evenly split among electrodes E2 (−50%) and E10 (−50%). The anodic current for the second channel is split among electrodes E5 (40%) and E13 (60%), and the cathodic current for the second channel is split among electrodes E7 (−20%), E8 (−10%), E15 (−40%) and E16 (−30%). Additional channels may be used. Further, the system may be designed with arbitration or mechanisms for handling situations when two or more channels are attempting to deliver electrical energy to the same electrode at the same time.

Various embodiments of the present subject matter may use "a target pole" or "target multipoles." These target pole(s) or target may be referred to as "ideal" or "virtual" pole(s). Each target pole of a target multipole may correspond to one physical electrode, but may also correspond to a space that does not correspond to one electrode, and may be emulated using electrode fractionalization. By way of examples, U.S. Pat. Nos. 8,412,345 and 8,909,350 describe target multipoles. U.S. Pat. Nos. 8,412,345 and 8,909,350 are hereby incorporated by reference in their entirety. Target multipoles are briefly described herein. A stimulation target in the form of a target poles (e.g., a target multipole such as a target bipole or target tripole or a target multipole with more than three target poles) may be defined and the stimulation parameters, including the allocated energy values (e.g. fractionalized current values) on each of the electrodes, may be computationally determined in a manner that emulates these target poles. The fractionalized current for each of the active electrodes contribute to the pole(s). For example, a target cathodic pole may be created using one or more activated electrodes configured as cathodic electrodes, where a sum of the fractionalized current for each of the activated cathodic electrodes in the channel equal 100%. The anodic current may be placed on the can electrode. Two cathodic target poles may be created using activated electrodes configured as cathodic electrodes. A sum of the fractionalized current for each of a first number of the activated cathodic electrodes form one of the target cathodic poles and a sum of the fractionalized current for the remainder of the activated cathodic electrodes form the other of the target cathodic poles. A sum of the fractionalized current for each of the activated cathodic electrodes in the channel equal 100%. Target multipoles may include at least one cathodic target pole and at least one anodic target pole, more than one cathodic target pole, or more than one anodic pole. Current steering may be implemented by moving the target poles about the leads, such that the appropriate allocated energy values (e.g., fractionalized current values) for the electrodes are computed for each of the various positions of the target pole.

Figure 8:
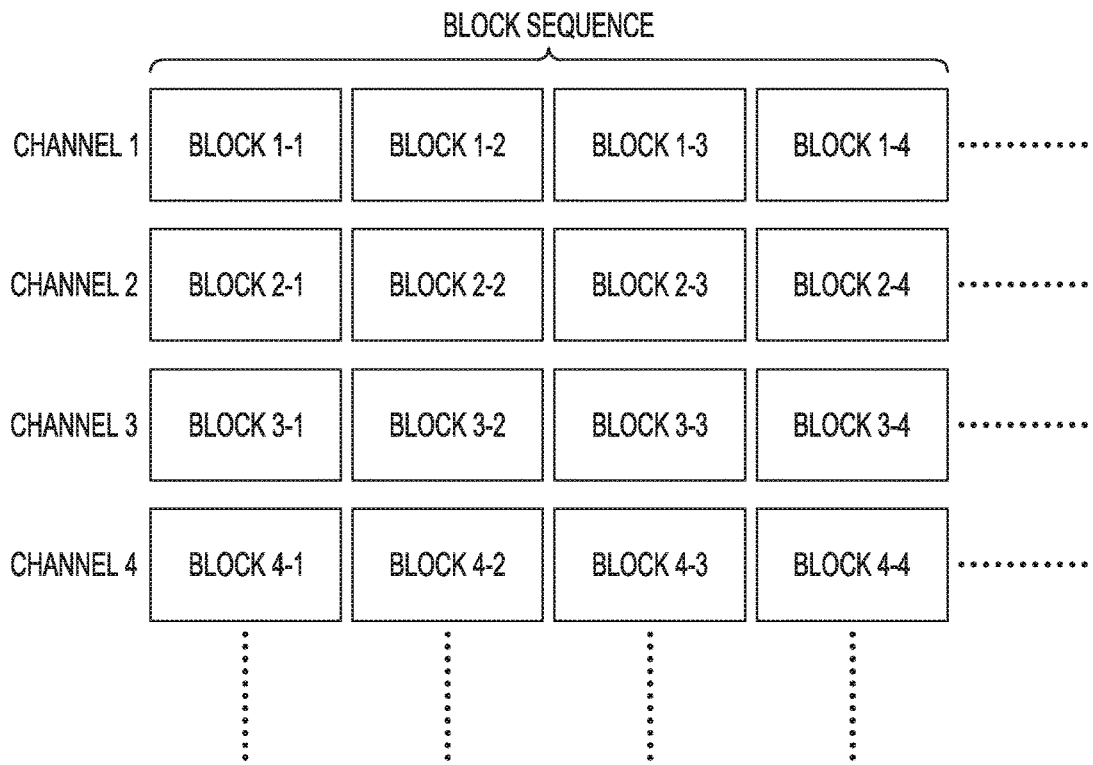
FIG. 8 illustrates, by way of example and not limitation, block sequences for four timing channels.

FIG. 8 illustrates, by way of example and not limitation, block sequences for four timing channels. Each of the channels has a block sequence corresponding to the channel's row in the table. For example, the first timing channel corresponds to Block 1-1, Block 1-2, Block 1-3 and Block 1-4. Similarly, the second timing channel corresponds to Block 2-1, Block 2-2, Block 2-3 and Block 2-4. Each block represents its own modulation parameter set, including an electrode configuration for that modulation parameter set. Thus, different blocks may correspond to different modulation fields that have different target pole(s), as the electrode configurations may have different activated electrodes, and/or different fractionalized values. These different modulation fields may target completely different volumes of tissue, or may generally target the same volume of tissue but using different polarities and modulation field shapes to create different field orientations. The present subject matter is not limited to four channels as the number of channels may be more or less than four, and is not limited to four blocks per channel, as the number of blocks per channel may be more or less than four blocks. Furthermore, the timing of the blocks (e.g. start time, stop time, duration, inter-block intervals, etc.) may be independently controlled for each of the timing channels.

Figure 9:
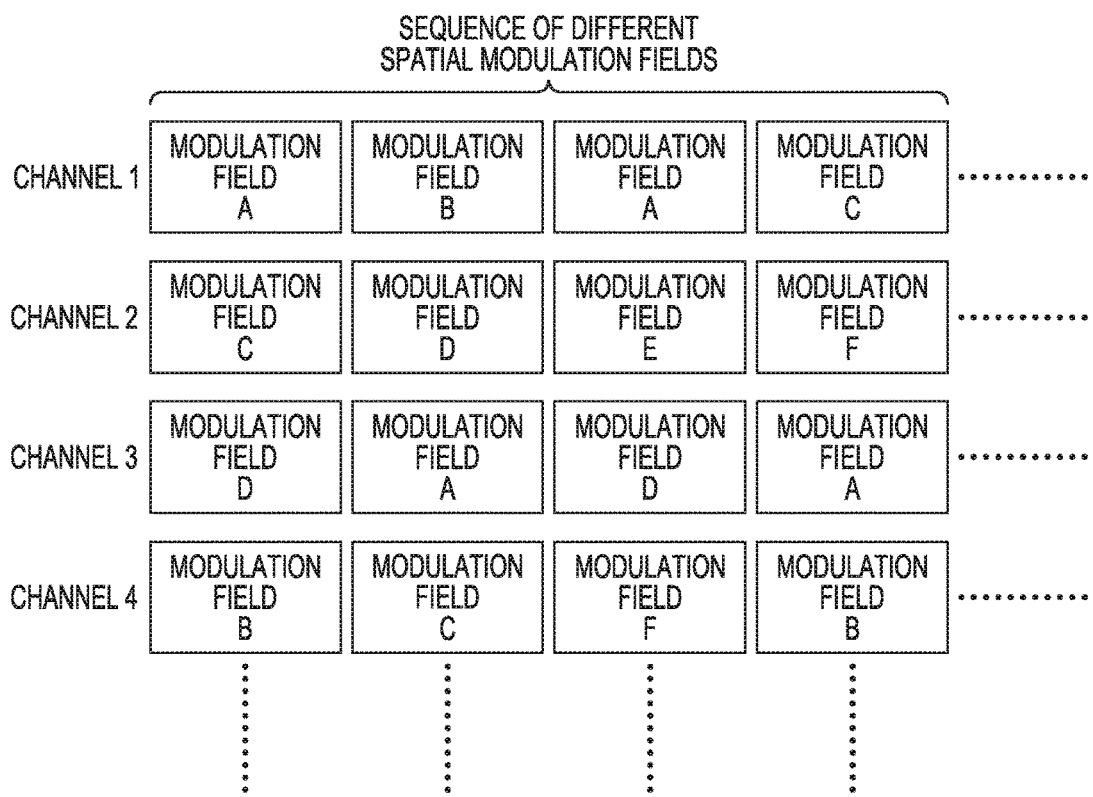
FIG. 9 illustrates a specific example of the block sequences in FIG. 8, where the block sequences are selected and ordered using spatially-different modulation field A-F.

FIG. 9 illustrates a specific example of the block sequences in FIG. 8, where the block sequences are selected and ordered using spatially-different modulation field A-F. Each of the modulation fields represent different electrode configuration (e.g. different activated electrodes, fractionalized values for the electrodes). These modulation fields may be available for selection by the user interface to create the order of fields in each sequence. Thus, by way of example, Modulation Field A may be selected for use in Timing Channel 1 as the first and third block in the sequence, and may be selected for use in Timing Channel 2 as the second and fourth block in the sequence. Similarly, Modulation Field B may be selected for use in Timing Channel 1 as the second block in the sequence, and may be selected for use in Timing Channel 4 as the first and fourth blocks in the sequence. In various embodiments, the user interface of the system may be configured to provide a list of the available fields for selection and may be further configured to allow drag-n-drop programming into channel's block sequence to thereby define the order of modulation of fields in the sequence. In other embodiments, the user interface may be configured for the user to add a block into a sequence and then select the modulation field from the list of available fields. In various embodiments, the user interface may be configured to create or modify the target pole(s) associated with each modulation field, and/or create or modify the modulation parameter sets corresponding to each block associated with the modulation field.

Figure 10:
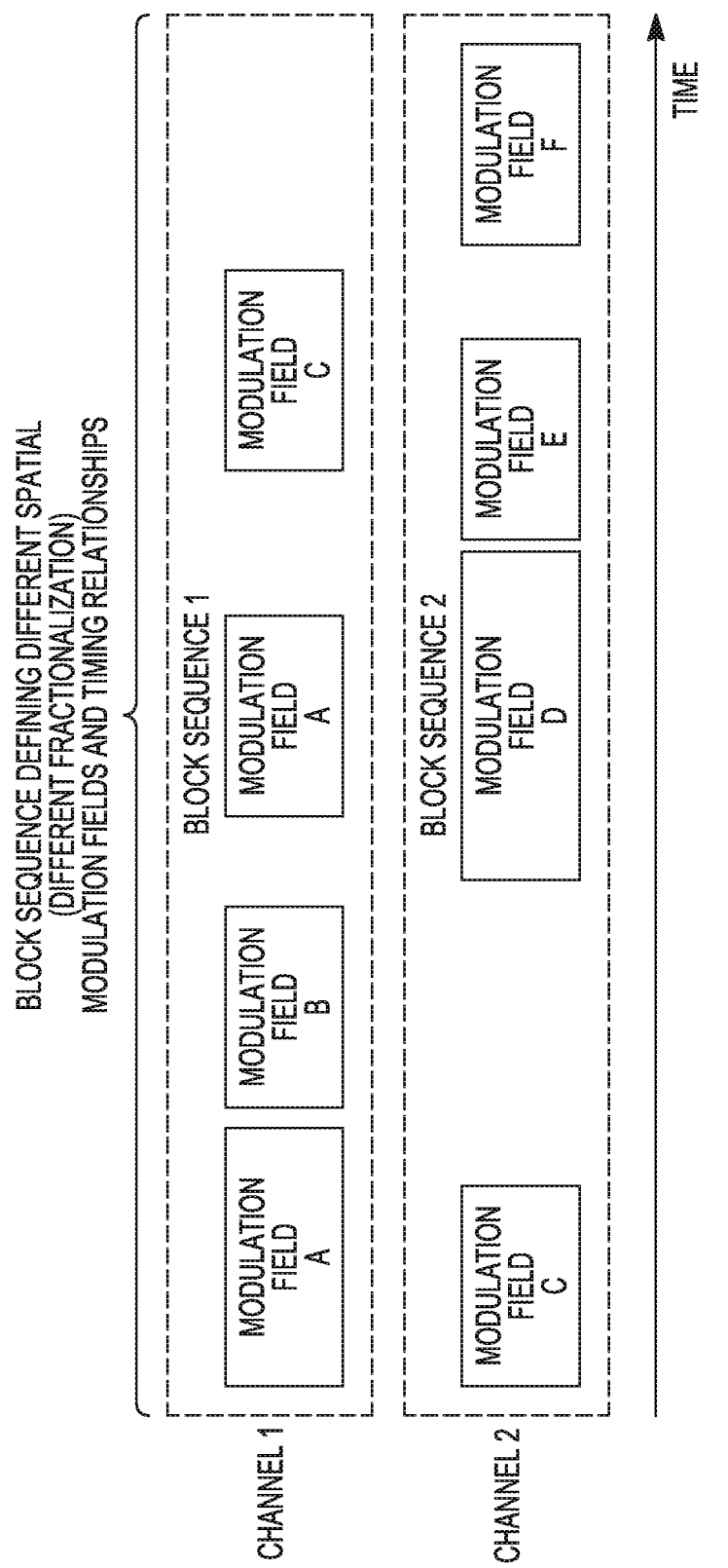
FIG. 10 illustrates, by way of example and not limitation, the block sequences in FIG. 9 for channels 1-2 with illustrated timing relationships between the blocks in those sequences.

FIG. 10 illustrates, by way of example and not limitation, the block sequences in FIG. 9 for channels 1-2 with illustrated timing relationships between the blocks in those sequences. These timing relationships may be programmed by the user so that the different fields will have different start time, stop time, duration, etc. The timing relationships may be based on an absolute time (system clock), or may be based on relative timing relationships between blocks in the same or different timing channels such as, by way of example and not limitation, a delay after another block starts or delay after another block ends. The timing relationships may include whether a sequence repeats and timing between repeats of the sequence.

Figure 11A:
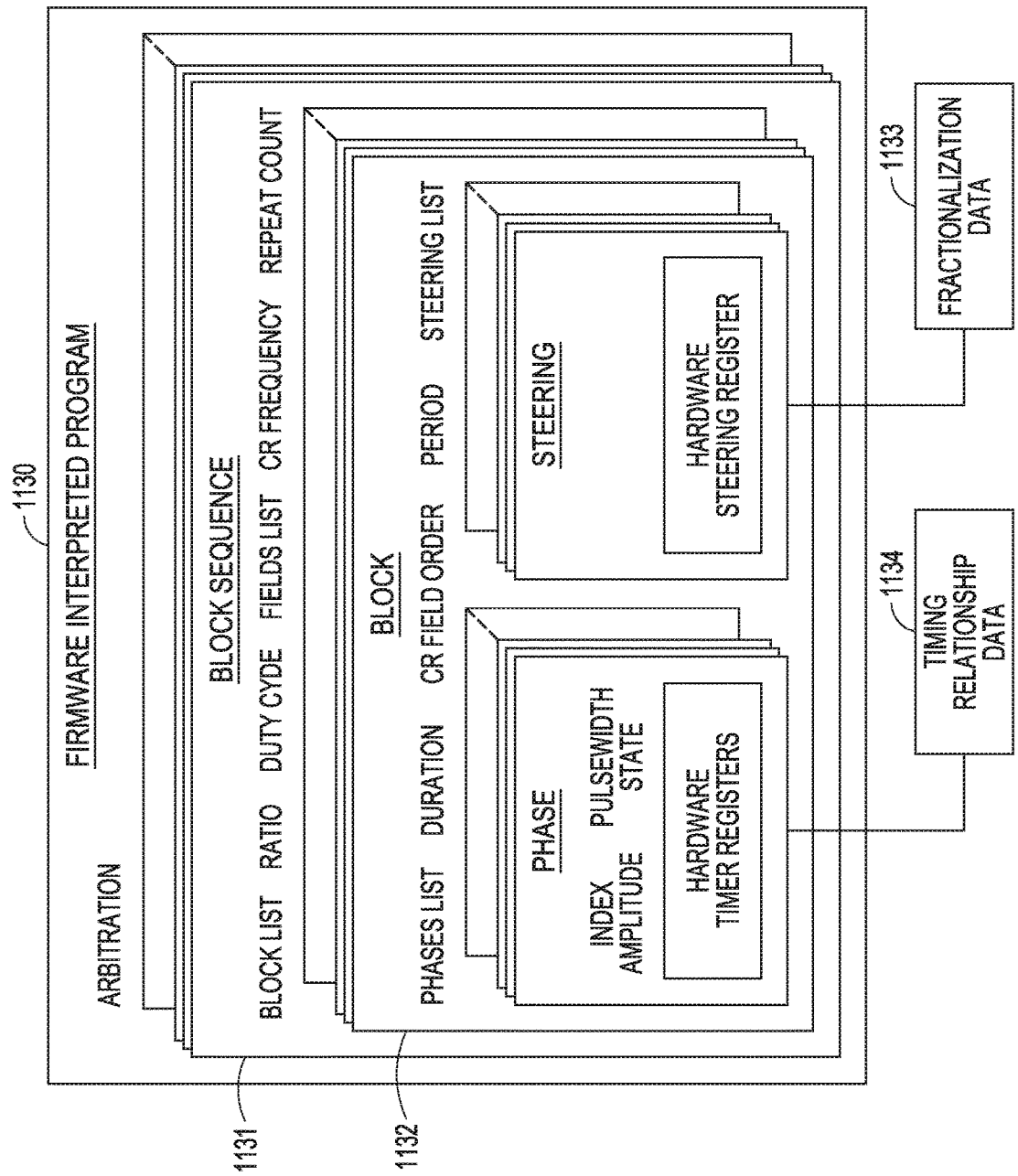
FIG. 11A illustrates an example of a neuromodulator program, where the program includes block sequence(s), the block sequence(s) includes block(s), and the block(s) include neuromodulation instructions to be stored in registers of the neuromodulator.

FIG. 11A is an illustration of a neuromodulator program 1130 that includes block sequences 1131, where the block sequences includes blocks 1132, and the blocks include neuromodulation instructions which may include fractionalization data 1133 (e.g. steering data) and timing relationship data 1134 (e.g. phases and timer). Both the fractionalization data and timing relationship data are communicated to the neuromodulator for storage in the hardware registers. The steering data 1138 may be stored hardware steering registers to control the allocated current for each active electrode and the timing relationship data 1134 may be stored in hardware timer registers. In the illustrated example, each electrode may have 8 bits of fractionalization data. Thus, a sixteen bit register may include fractionalization data for two electrodes (e.g. electrodes E0 and E1 ("E1E0 branch")). The fractionalization data stored in these registers for all of the electrodes are used to control the allocated current for each active electrode and thus generate the target poles for a modulation field.

Each block 1132 may include pulses that are made up of phases. Each pulse of the block may have parameter data, and this parameter data for each pulse may include Phases, Steering List, Period, Duration and Field Order List. Each pulse in each block may include phases (e.g. Phase 1, Phase 2, Phase 3) and each phase may include an amplitude and pulse width.

Each phase may include phase elements such as amplitude, pulse width, state and index. The amplitude may represent the amplitude of the phase. The pulse width may represent the duration of the phase. The state may represent whether the phase is an active phase, a passive phase or a delay phase. The index may represent a phase number for the phases within the pulse.

Each block may include block elements such as a phase list, duration, field order, period and steering list. The phase list identifies the phases that make up a pulse. The steering list identifies the electrode settings including polarity and fractionalization. The period may identify the period of the pulse. The duration may identify the duration of the block. The field order may identify a listing that specifies the field order from fields defined in the block sequences field list.

The blocks may be arranged in sequences. Each sequence may include block sequence elements such as block list, ratio, duty cycle, fields list, frequency (such as CR frequency), and repeat count. The block list may be an array of blocks. The ratio may be a block on/off ratio. The ratio may be referred to as micro-scheduling. The duty cycle may be the duration of the block ratio in minutes. The duty cycle may also be referred to as macro-scheduling. The field list may list possible electrode settings including fractionalization data. The frequency may be the frequency to repeat the electrode field combinations. The repeat count may be the number of times to repeat the sequence.

Figure 11B:
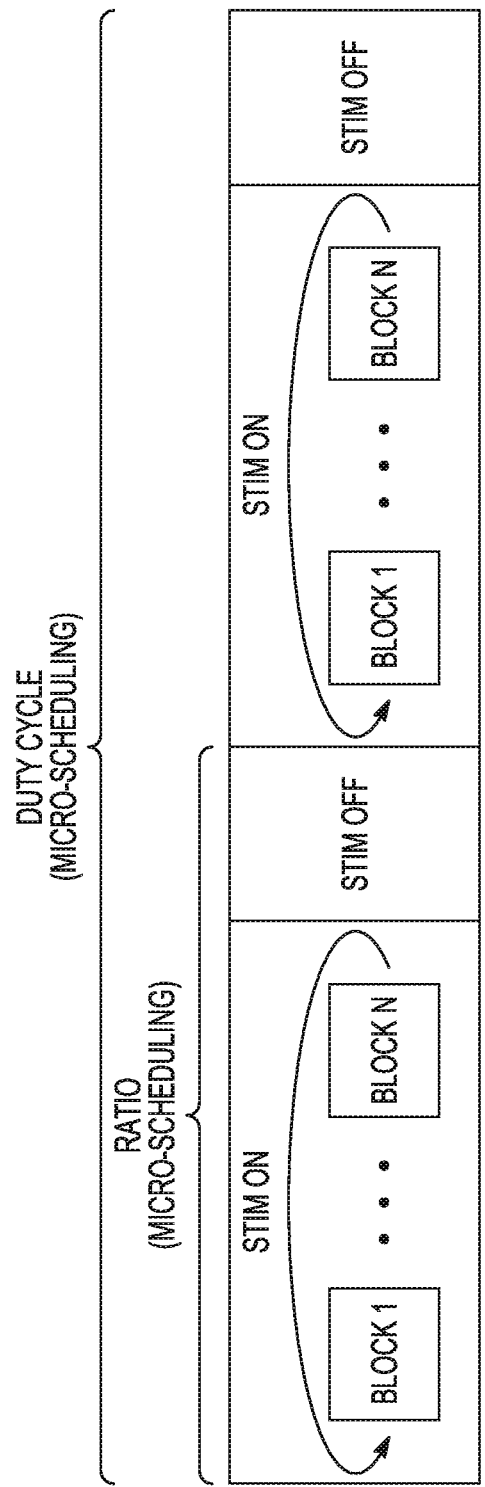
FIG. 11B illustrates, by way of example and not limitation, micro-scheduling of blocks (Ratio) and macro-scheduling of blocks (Duty Cycle)
Figure 11C:
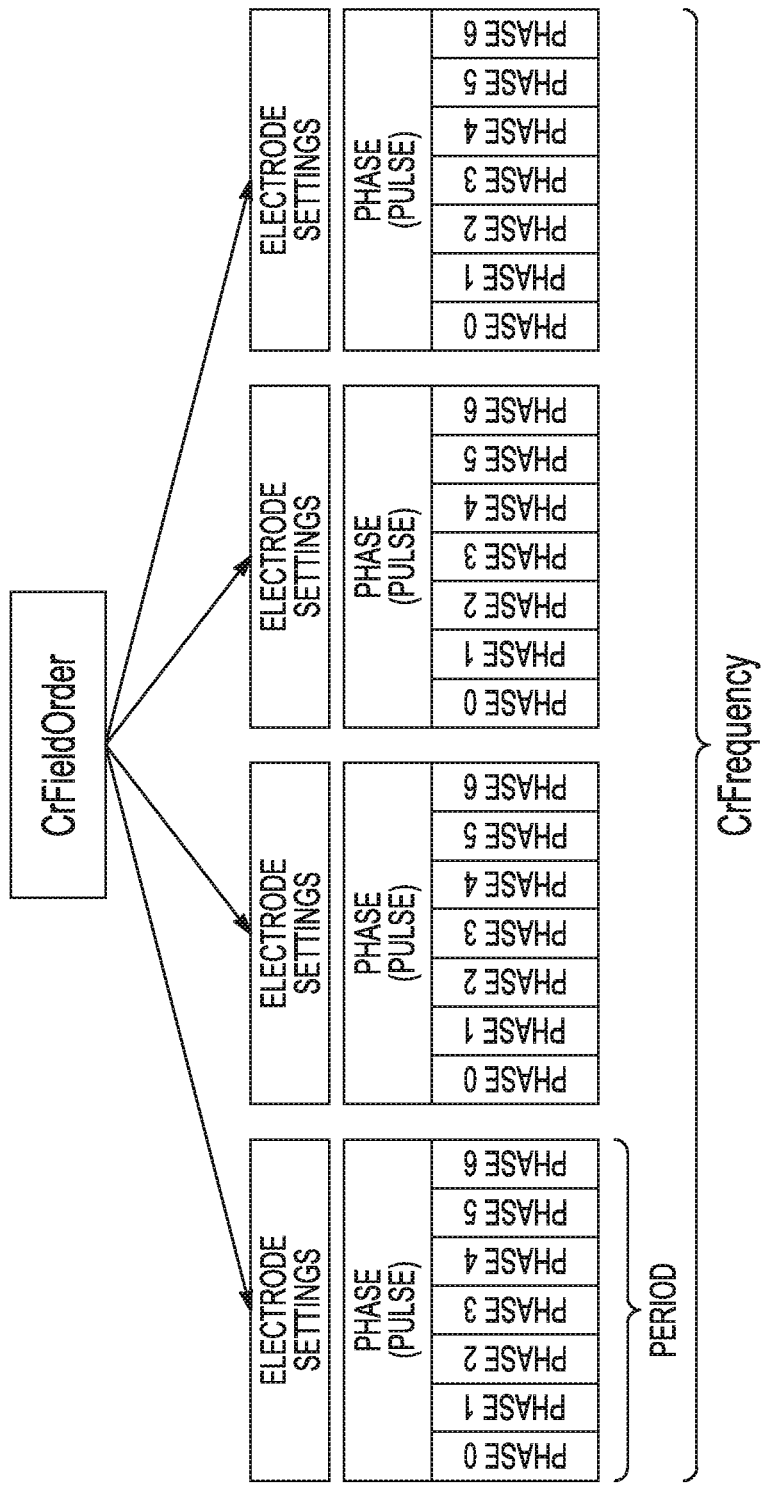
FIG. 11C illustrates, by way of example, phases (Phase0-Phase6) of the pulse, and the electrodes settings for each pulse to create a field.

FIG. 11B illustrates, by way of example and not limitation, micro-scheduling of blocks (Ratio) and macro-scheduling of blocks (Duty Cycle). FIG. 11C illustrates, by way of example, phases (Phase0-Phase6) of the pulse, and the electrodes settings for each pulse to create a field. The fields (generated by an electrode setting for a pulse) may be ordered using the CR Field Order. Also illustrated is the order of pulses (electrode field combinations) that may be repeated according to the CR Frequency.

Figure 12:
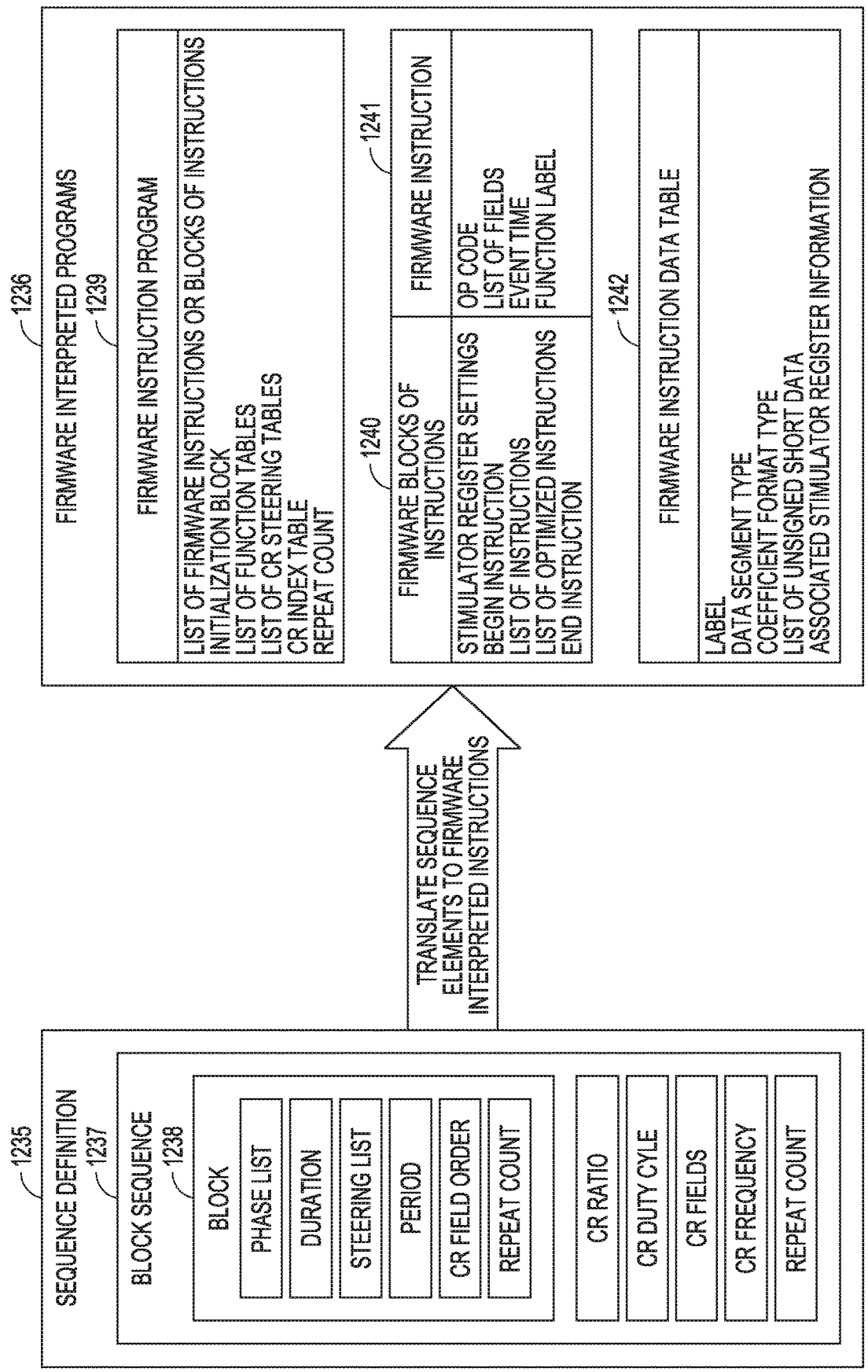
FIG. 12 illustrates, by way of example and not limitation, a translation from a user-inputted sequence definition into a neuromodulation definition.

FIG. 12 is an illustration of a translation from a user-inputted sequence definition 1235 into neuromodulation definition 1236. A user interface may be configured to receive user input in order to form the sequence definition. The user interface may be configured to enable the user to enter various data that generally correspond to the sequence of blocks and the timing relationships for the blocks. For example, the user-inputted data forming the block sequence 1237 may contain user-inputted data for blocks 1238 which may include, by way of example: a list of phases, a duration of the block, a list steering tables (electrode configurations including fractionalized values for active electrodes), a period, a CR field order, and a repeat count for the number of blocks. The user-inputted data forming the block sequence 1237 may further include CR Ratio, CR Duty Cycle, CR fields, CR frequency and Repeat count.

The neuromodulation definition 1236 contains information from the sequence definition 1235 after translation into assembly language. The neuromodulation definition 1236 may include program information 1239, firmware block of instructions 1240, firmware instruction information 1241 and a firmware instruction data table 1242. The program information 1239 may provide: a list of firmware instructions or blocks of instructions; an initialization block, a list of function tables, a list of CR steering tables, a CR index table for use to index into the CR steering tables, and a repeat count. The firmware block of instructions may include: stimulator register settings for this block; begin instruction; list of instructions to set the corresponding register; list of optimized instructions which are instructions that optimize the list of instructions to minimize memory usage; and end instruction. The firmware instruction may include OpCode which specifies the operation to be performed such as setting a register, staring a stimulation, and looping. The firmware instruction may include a list of fields, an event time, and a function label. The firmware instruction table may include a label, a data segment type, a coefficient format type, a list of unsigned short data, and associated stimulator register information.

Figure 13:
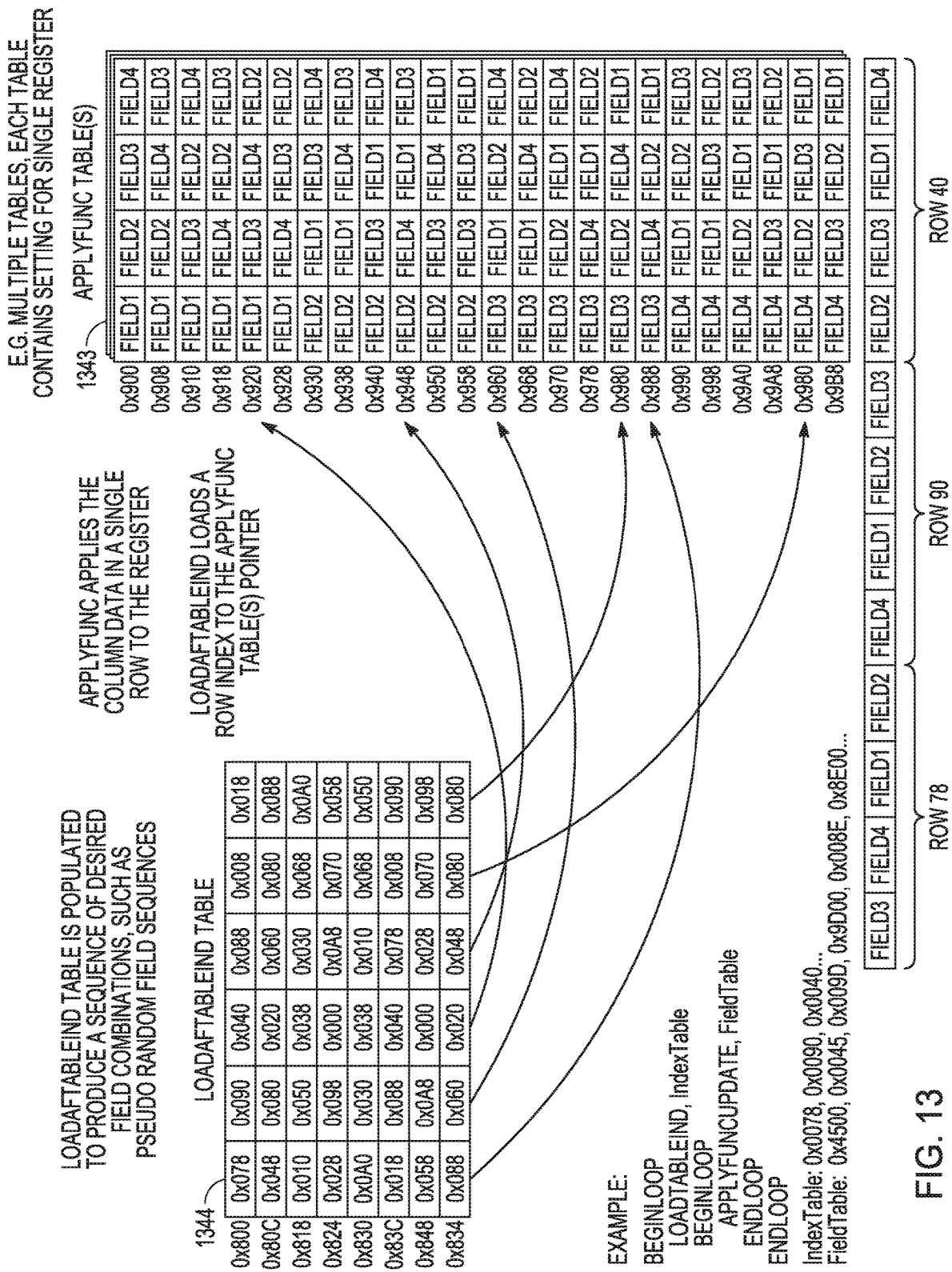
FIG. 13 illustrates, by way of example and not limitation, tables containing spatially-different modulation fields where each row includes data for sequence of neuromodulation fields, and further includes an index table for use to identify a pointer to the tables.

FIG. 13 illustrates, by way of example and not limitation, tables containing spatially-different modulation fields where each row includes data for sequence of neuromodulation fields, and further includes an index table for use to identify a pointer to the tables. As provided above, the program information may provide a list of CR steering tables, and a CR index table for use to index into the CR steering tables. The neuromodulator has a plurality of registers for storing neuromodulation parameter data. An individual one of these registers may be configured to store neuromodulation parameter data for at least one of the plurality of electrodes. The programming system may include a plurality of field order tables corresponding to the plurality of registers. Each of the plurality of tables may contain settings for a respective one of the plurality of registers. Each of the plurality of field order tables include a plurality of rows and a plurality of columns. The plurality of rows corresponds to a plurality of block sequences, respectively, to define field order settings. The illustrated table provides a row for the possible permutations for ordering four distinct fields (labeled Field1, Field2, Field 3 and Field 4). For example, each of the plurality of rows may correspond to the register data for a single register, which may contain register data for two of the plurality of electrodes. The CR index table 1344 (also referenced as LOADAFTABLEIND TABLE) may be populated to produce a sequence of desired field combinations, such as pseudo random field sequences. The translator may be configured to use the block sequence descriptions to determine one of the pointers for use to identify a row in the field order tables for use to load neuromodulation data from that row into one of the plurality of registers. Thus, a pointer may be selected for use to select a row in the steering table to provide the desired sequence of fields for a register. For example, the register may be a 16 bit register, and may contain data for two electrodes (8 bits per electrode) in the electrode array. FIG. 13 illustrates an example where a sequence of data from the index table 1344 (0x0078; 0x0090; 0x0040 . . . ) are used to index into Row 78 (0x978), Row 90 (0x990) and Row 40 (0x940) of the CR Steering tables 1343.

Figure 14:
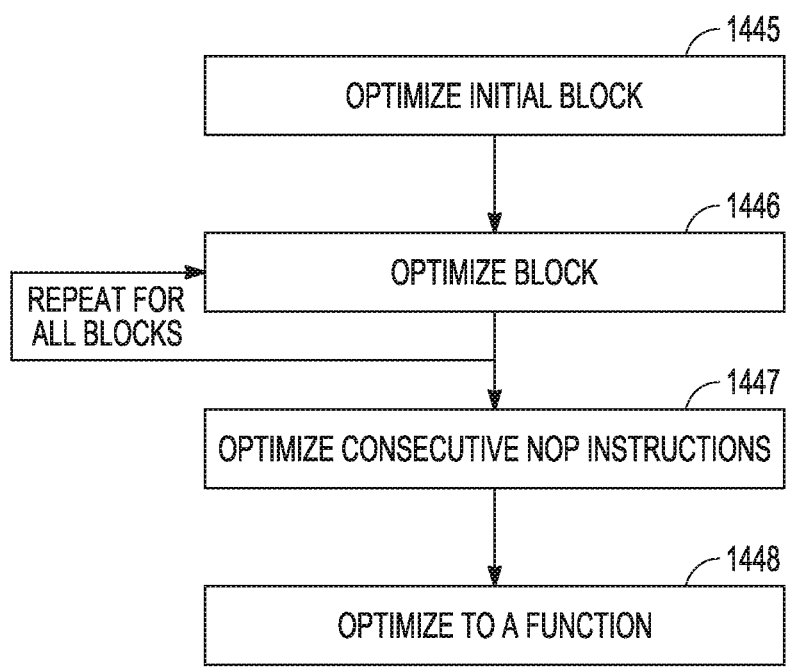
FIG. 14 illustrates an example of a process to optimize the blocks for transmitting and storing register data.

FIG. 14 illustrates an example of a process to optimize the blocks for transmitting and storing register data. After the sequence definition translates to blocks of instructions and/or instructions, the programmer system may optimize the instructions to update multiple Application Specific Integrated Circuit (ASIC) register settings at the same time and to minimize memory usage. Optimization may be performed starting with an initial block 1445, and then performing a block-by-block optimization for all blocks in the sequence 1446. Once all blocks are optimized then it is determined if there are consecutive no operation blocks that can be combined to a single block (e.g. 1447) and determined if blocks can be optimized to a function 1448 (e.g. a function in the function tables within the program, as illustrated in FIG. 13).

Figure 15:
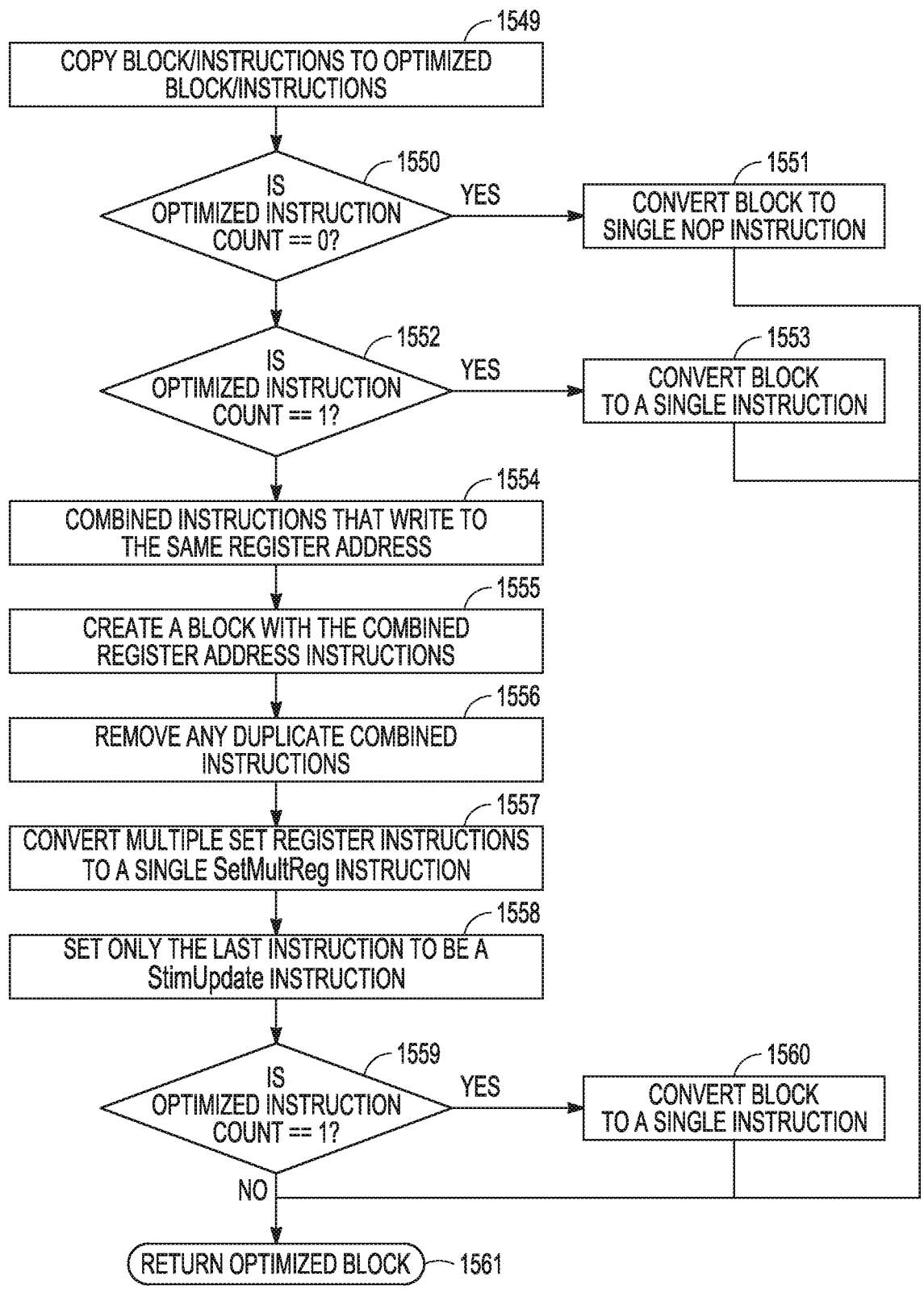
FIG. 15 illustrates an example of a process for optimizing an instruction or block of instructions.

FIG. 15 illustrates an example of a process for optimizing an instruction or block of instructions. At 1549, the block or instructions are copied to optimized block/instructions. If at 1550 the optimized instruction count is 0, then the block is converted to a signal NOP instruction 1551. If at 1552 the optimized instruction count is 1, then the block is converted to a single instruction. If the optimized instruction count is not 0 and is not 1, then the process may continue at 1554 to combine instructions that write to the same register address. The process may continue at 1555 to create a block with the combined register address instructions. Any duplicate combined instructions may be removed at 1556. At 1557, multiple Set Register instructions may be converted to a single SetMultiReg instruction. As illustrated at 1558, only the last instruction may be set to be a StimUpdate instruction. If at 1559, the Optimized instruction count is 1, then the block may be converted to a single instruction. Otherwise, the process may return the optimized block 1561.

Figure 16:
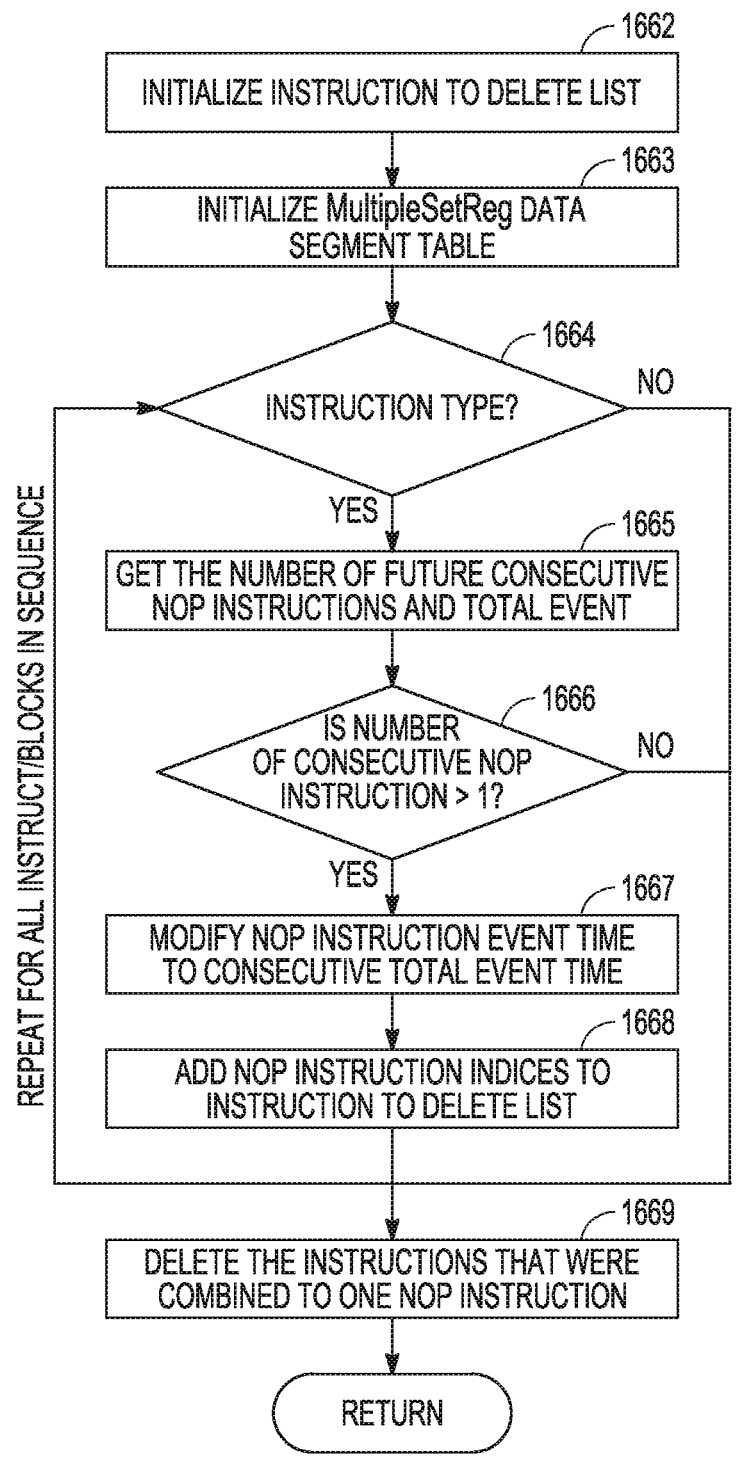
FIG. 16 illustrates an example of a process for optimizing consecutive NOP instructions.

FIG. 16 illustrates an example of a process for optimizing consecutive NOP instructions. At 1662, the process may initialize the instruction to delete list; and at 1663, the process may initialize multiple set Reg Data segment table. At 1664, the instruction type is determined. At 1664, the number of future consecutive NOP instructions and totalEvent is determined. If at 1666 the total number of consecutive NOP instructions is greater than 1, then the process may modify the NOP instruction event time to consecutive total event time 1667, and may add NOP instruction indices to the Instruction To Delete list 1668. The process steps 1664-1668 may be repeated for all instructions/blocks in the sequence. At 1669, the instructions that were combined into one NOP instruction maybe deleted.

Figure 17:
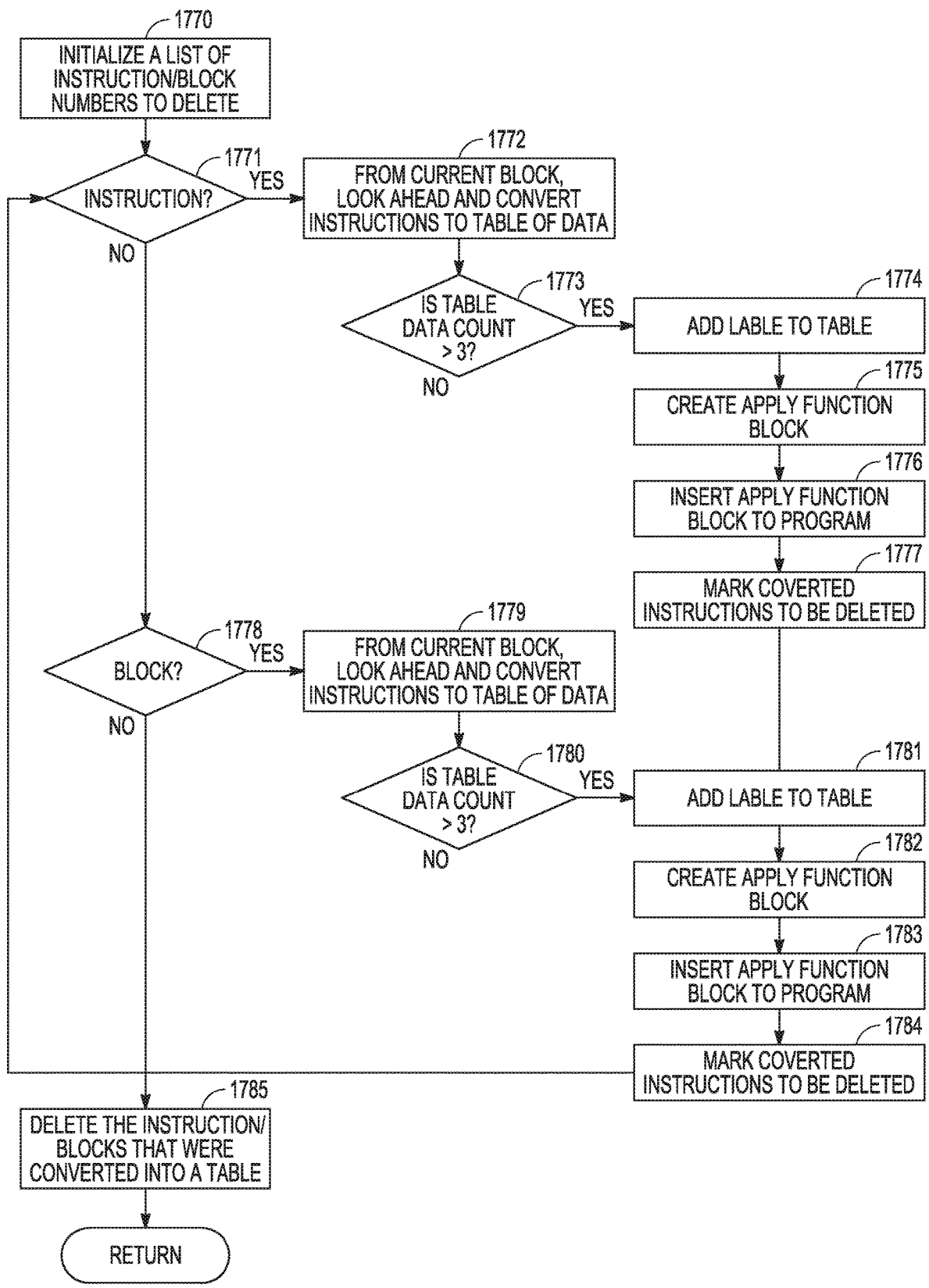
FIG. 17 illustrates an example of a process for optimizing a series of instructions to a single Function instruction.

FIG. 17 illustrates an example of a process for optimizing a series of instructions to a single Function instruction. At 1770, the process may initialize a list of instructions/block numbers to delete. If instructions are to be deleted at 1771, the process proceeds to 1772 to look ahead from the current block and convert instructions to table of data. If at 1773 the table data count is greater than 3, then a label is added to the table 1774, an apply function block is created 1775, an apply function block is inserted into the program 1776, and converted instructions are marked to be deleted 1777. Similarly, if instructions are to be deleted at 1778, the process proceeds to 1779 to look ahead from the current block and convert instructions to table of data. If at 1780 the table data count is greater than 3, then a label is added to the table 1781, an apply function block is created 1782, an apply function block is inserted into the program 1783, and converted instructions are marked to be deleted 1784. At 1785, the instructions/blocks that were converted into a table may be deleted.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using combinations or permutations of those elements shown or described.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The scope of the invention should be determined with reference to the appended claims, along with the full scope of equivalents to which such claims are entitled.

What is claimed is:

1. A method, comprising: programming a neuromodulator to deliver neuromodulation to generate at least two different sequences of neuromodulation fields for at least two neuromodulation sites, wherein the programming includes:

receiving user input including, for each of the at least two neuromodulation sites, receiving a selection of neuromodulation fields from a plurality of neuromodulation fields available for selection, defining an order for the selection of the neuromodulation fields, and receiving timing relationships for the neuromodulation fields in the selection including timing between successive neuromodulation fields in the selection and timing for repeating a sequence of neuromodulation fields in the selection;

creating at least two block sequence descriptions for the at least two neuromodulation sites, respectively, based on the selection of modulation fields, the order and the timing relationships from the user input, wherein each of the at least two block sequence descriptions defines both a sequence of blocks and timing relationships between the blocks in the sequence to provide different block sequence descriptions including to provide a first of the at least two block sequence descriptions with a first sequence of blocks and timing relationships between the blocks in the first sequence and to provide a second of the at least two block sequence descriptions with a second sequence of blocks and timing relationships between the blocks in the second sequence, and each of the blocks corresponds to a neuromodulation field generated using fractionalized data for a corresponding neuromodulation parameter set;

translating the at least two block sequence descriptions into neuromodulator instructions and processing the neuromodulator instructions to update multiple register settings at a same time and reduce memory usage, the neuromodulator instructions including steering data for each block in the sequence of blocks and timing relationship data for the blocks within the sequence of blocks;

wirelessly communicating the neuromodulator instructions to the neuromodulator, the neuromodulator configured to store the steering data in hardware steering registers and store the timing relationship data in hardware timing registers, and to use the hardware steering registers and the hardware timing registers to implement the neuromodulator instructions to deliver the neuromodulation using at least two channels to generate the at least two different sequences of neuromodulation fields for the at least two neuromodulation sites according to the at least two block sequence descriptions; and delivering the neuromodulation, using the neuromodulator, to generate the at least two different sequences of neuromodulation fields for the at least two neuromodulation sites according to the at least two block sequence descriptions.

2. The method of claim 1, wherein the translating the at least two block sequence descriptions into the neuromodulator instructions includes using a translator to translate the at least two block sequence descriptions into assembly language, and using an assembler to translate the assembly language into the neuromodulator instructions.

3. The method of claim 1, further comprising determining whether the blocks can be optimized to a function or can combine consecutive no operation blocks.

4. The method of claim 1, wherein the neuromodulator instructions wirelessly communicated to the neuromodulator includes bytes corresponding to fractionalized energy allocated to individual ones of a plurality of electrodes, the method further including storing the bytes in registers of the neuromodulator for use by the neuromodulator to allocate energy to the individual ones of the plurality of electrodes.

5. The method of claim 4, wherein the neuromodulator includes a plurality of independent current sources for the plurality of electrodes, respectively, and the bytes in the registers of the neuromodulator are used by the independent current sources to generate current amplitudes for the individual ones of the plurality of electrodes.

6. The method of claim 1, wherein the blocks in the sequence of blocks correspond to different electrode configurations to create a sequence of spatially different modulation fields.

7. The method of claim 1, wherein the user input includes user input to select and order blocks for the sequence of blocks, and an amplitude, pulse width and rate are associated with each of the blocks.

8. The method of claim 1, wherein the sequence of blocks includes Off blocks for which no neuromodulation is provided.

9. The method of claim 1, wherein the timing relationships include at least one of:
inter-block timing between blocks in the sequence of blocks; or
a duration, a start time or a stop time for blocks in the sequence of blocks.

10. The method of claim 1, wherein the sequence of blocks is repeated and associated with an ON-OFF duty cycle representing an ON time for repeating the sequence of blocks and an OFF time.

11. The method of claim 1, wherein the translating the at least two block sequence descriptions into the neuromodulator instructions includes using a plurality of field order tables corresponding to the hardware steering registers to store the steering data.

12. The method of claim 11, wherein each of the plurality of field order tables include a plurality of rows and a plurality of columns, and the plurality of rows corresponds to a plurality of block sequences, respectively, to define field order settings.

13. The method of claim 12, further comprising translating the at least two block sequence descriptions into assembly language, and using both an index table containing pointers to the plurality of rows in the field order tables and the at least two block sequence descriptions to determine one of the pointers for use to provide the steering data.

14. A non-transitory machine-readable medium including instructions, which when executed by a machine, cause the machine to perform a method for programming a neuromodulator to deliver neuromodulation to generate at least two different sequences of neuromodulation fields for at least two neuromodulation sites, comprising:

receiving user input including, for each of the at least two neuromodulation sites, receiving a selection of neuromodulation fields from a plurality of neuromodulation fields available for selection, defining an order for the selection of the neuromodulation fields, and receiving timing relationships for the neuromodulation fields in the selection including timing between successive neuromodulation fields in the selection and timing for repeating a sequence of neuromodulation fields in the selection;

creating at least two block sequence descriptions for the at least two neuromodulation sites, respectively, based on the selection of modulation fields, the order and the timing relationships from the user input, wherein each of the at least two block sequence descriptions defines both a sequence of blocks and timing relationships between the blocks in the sequence to provide different block sequence descriptions including to provide a first of the at least two block sequence descriptions with a first sequence of blocks and timing relationships between the blocks in the first sequence and to provide a second of the at least two block sequence descriptions with a second sequence of blocks and timing relationships between the blocks in the second sequence, and each of the blocks corresponds to a neuromodulation field generated using fractionalized data for a corresponding neuromodulation parameter set;

translating the at least two block sequence descriptions into neuromodulator instructions and processing the neuromodulator instructions to update multiple register settings at a same time and reduce memory usage, the neuromodulator instructions including steering data for each block in the sequence of blocks and timing relationship data for the blocks within the sequence of blocks, and wirelessly communicating the neuromodulator instructions to the neuromodulator, the neuromodulator configured to store the steering data in hardware steering registers and store the timing relationship data in hardware timing registers, and to use the hardware steering registers and the hardware timing registers to implement the neuromodulator instructions to deliver the neuromodulation using at least two channels to generate the at least two different sequences of neuromodulation fields, wherein the neuromodulator is configured to deliver the neuromodulation to generate the at least two different sequences of neuromodulation fields for the at least two neuromodulation sites according to the at least two block sequence descriptions.

15. The non-transitory machine-readable medium of claim 14, wherein the translating the at least two block sequence descriptions into the neuromodulator instructions includes translating the at least two block sequence descriptions into assembly language, and translating the assembly language into the neuromodulator instructions.

16. The non-transitory machine-readable medium of claim 14, wherein the neuromodulator instructions wirelessly communicated to the neuromodulator includes bytes corresponding to fractionalized energy allocated to individual ones of a plurality of electrodes, the method further including storing the bytes in registers of the neuromodulator for use by the neuromodulator to allocate energy to the individual ones of the plurality of electrodes.

17. The non-transitory machine-readable medium of claim 14, wherein the blocks in the sequence of blocks correspond to different electrode configurations to create a sequence of spatially different modulation fields, and the timing relationships include at least one of: inter-block timing between blocks in the sequence of blocks; or a duration, a start time or a stop time for blocks in the sequence of blocks.

18. The non-transitory machine-readable medium of claim 14, wherein the translating the at least two block sequence descriptions into the neuromodulator instructions includes using a plurality of field order tables corresponding to the hardware steering registers to store the steering data.

19. A system, comprising:
a neuromodulator, wherein the neuromodulator includes a neuromodulation generator and a plurality of electrodes for use to deliver neuromodulation to generate at least two different sequences of neuromodulation fields for at least two neuromodulation sites; and a programming system configured to wirelessly communicate with the neuromodulator, the programming system including a user interface, wherein the programming system is configured to receive user input, via the user interface, for the at least two neuromodulation sites, respectively, wherein the user input includes a selection of neuromodulation fields from a plurality of neuromodulation fields available for selection, defining an order for the selection of the neuromodulation fields, and timing relationships for the neuromodulation fields in the selection including timing between successive neuromodulation fields in the selection and timing for repeating a sequence of neuromodulation fields in the selection, and the programming system is configured to create at least two block sequence descriptions for the at least two neuromodulation sites, respectively, based on the selection of modulation fields, the order and the timing relationships from the user input, wherein each of the at least two block sequence descriptions defines both a sequence of blocks and timing relationships between the blocks in the sequence to provide different block sequence descriptions including to provide a first of the at least two block sequence descriptions with a first sequence of blocks and timing relationships between the blocks in the first sequence and to provide a second of the at least two block sequence descriptions with a second sequence of blocks and timing relationships between the blocks in the second sequence, wherein each of the blocks corresponds to a neuromodulation field generated using a corresponding neuromodulation parameter set, and wherein the programming system is configured to translate the at least two block sequence descriptions into neuromodulator instructions and process the neuromodulator instructions to update multiple register settings at a same time and reduce memory usage, the neuromodulator instructions including steering data for each block in the sequence of blocks and timing relationship data for the blocks within the sequence of blocks, and wireless communicate the neuromodulator instructions to the neuromodulator, the neuromodulator configured to store the steering data in hardware steering registers and store the timing relationship data in hardware timing registers, and to use the hardware steering registers and the hardware timing registers to implement the neuromodulator instructions to deliver the neuromodulation using at least two channels to generate the at least two different sequences of neuromodulation fields, wherein the neuromodulator is configured to deliver the neuromodulation to generate the at least two different sequences of neuromodulation fields for the at least two neuromodulation sites according to the at least two block sequence descriptions.

* * * * *